(12) United States Patent
Waters

(10) Patent No.: US 7,661,818 B2
(45) Date of Patent: Feb. 16, 2010

(54) CLIP-ON LIGHT APPARATUS

(76) Inventor: Michael Waters, 372 Bateman Cir. North, Barrington Hills, IL (US) 60010

(*) Notice: Subject to any disclaimer, the term of this patent is extended or adjusted under 35 U.S.C. 154(b) by 123 days.

(21) Appl. No.: 11/557,748

(22) Filed: Nov. 8, 2006

(65) Prior Publication Data

US 2007/0127250 A1   Jun. 7, 2007

Related U.S. Application Data

(63) Continuation-in-part of application No. 10/571,796, filed as application No. PCT/US02/35665 on Nov. 7, 2002, now Pat. No. 7,562,979, which is a continuation-in-part of application No. 10/145,595, filed on May 14, 2002, now Pat. No. 6,612,696, which is a continuation-in-part of application No. 10/006,919, filed on Nov. 7, 2001, now Pat. No. 6,612,695.

(51) Int. Cl.
    *G02C 1/00* (2006.01)
(52) U.S. Cl. .................. 351/158; 362/419; 362/421
(58) Field of Classification Search ............ 351/41, 351/47, 158; 362/103–108, 418–421
    See application file for complete search history.

(56) References Cited

U.S. PATENT DOCUMENTS

| 1,615,067 | A | * | 1/1927 | Boerman | 362/105 |
|---|---|---|---|---|---|
| 3,350,552 | A | | 10/1967 | Lawrence | |
| 3,793,517 | A | * | 2/1974 | Carlini | 362/106 |
| 5,164,749 | A | * | 11/1992 | Shelton | 351/47 |
| 5,667,291 | A | * | 9/1997 | Caplan et al. | 362/105 |
| 5,722,762 | A | | 3/1998 | Soll | |
| 6,749,166 | B2 | | 6/2004 | Valentine et al. | |
| 6,764,194 | B1 | * | 7/2004 | Cooper | 362/105 |
| 7,281,826 | B2 | * | 10/2007 | Huang | 362/398 |
| 2005/0254238 | A1 | * | 11/2005 | Parker et al. | 362/191 |

* cited by examiner

*Primary Examiner*—Huy K Mai
(74) *Attorney, Agent, or Firm*—Fitch, Even, Tabin & Flannery

(57) ABSTRACT

A clip-on light apparatus is provided having a polyaxial coupling joint between a light module and frame to permit the light module to be pivoted about a plurality of axes relative to the frame for directing light in a plurality of directions. The polyaxial coupling joint preferably permits pivoting of the light module about at least two orthogonal axes. In one form, the light module is mounted to a pivot shaft about which the module can be turned with the pivot shaft itself being pivoted along one of the two orthogonal pivot axes.

11 Claims, 13 Drawing Sheets

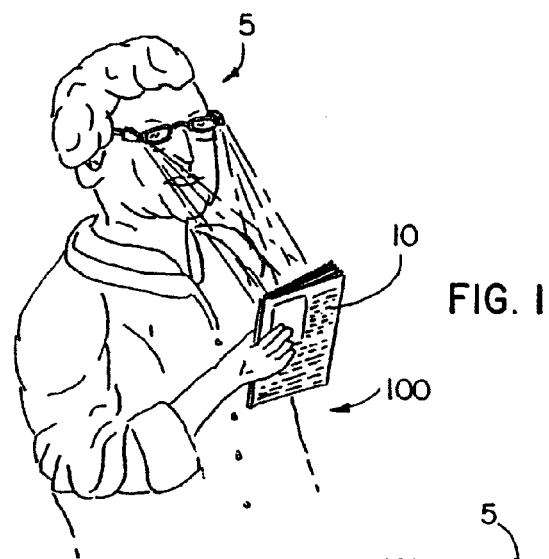
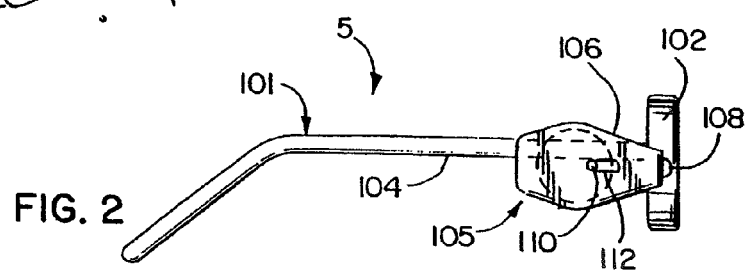
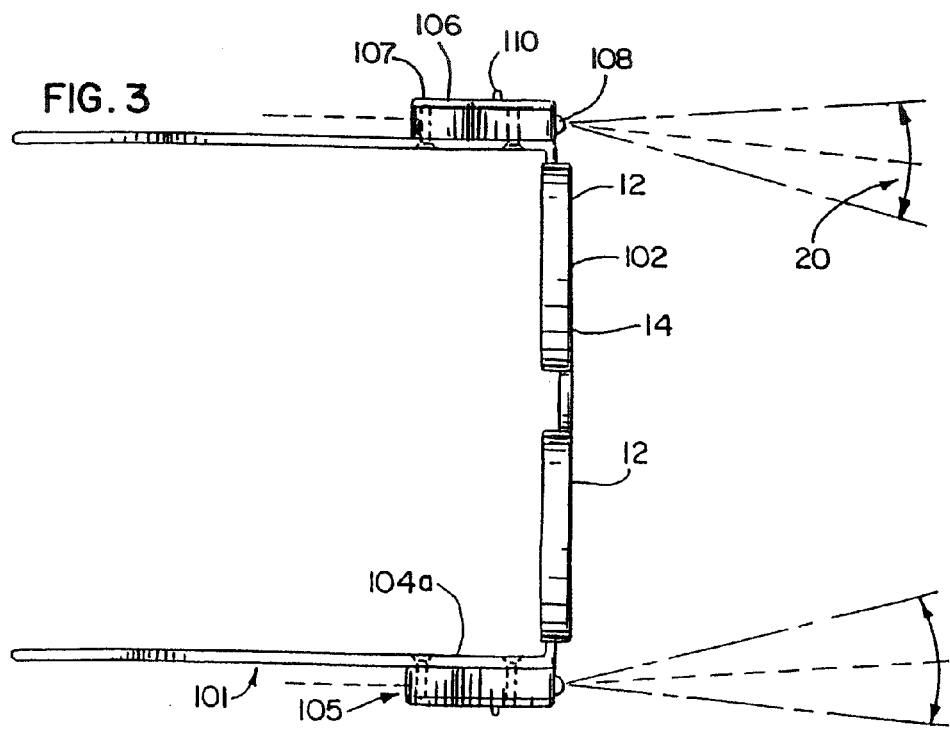

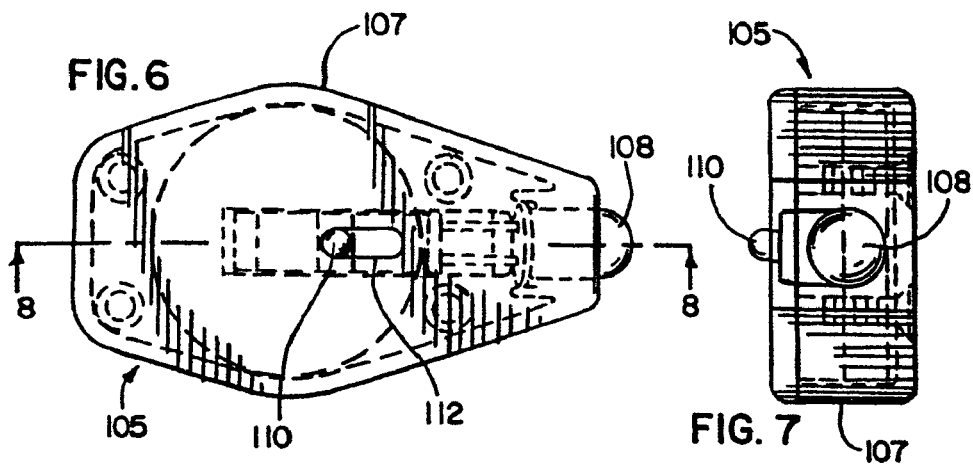
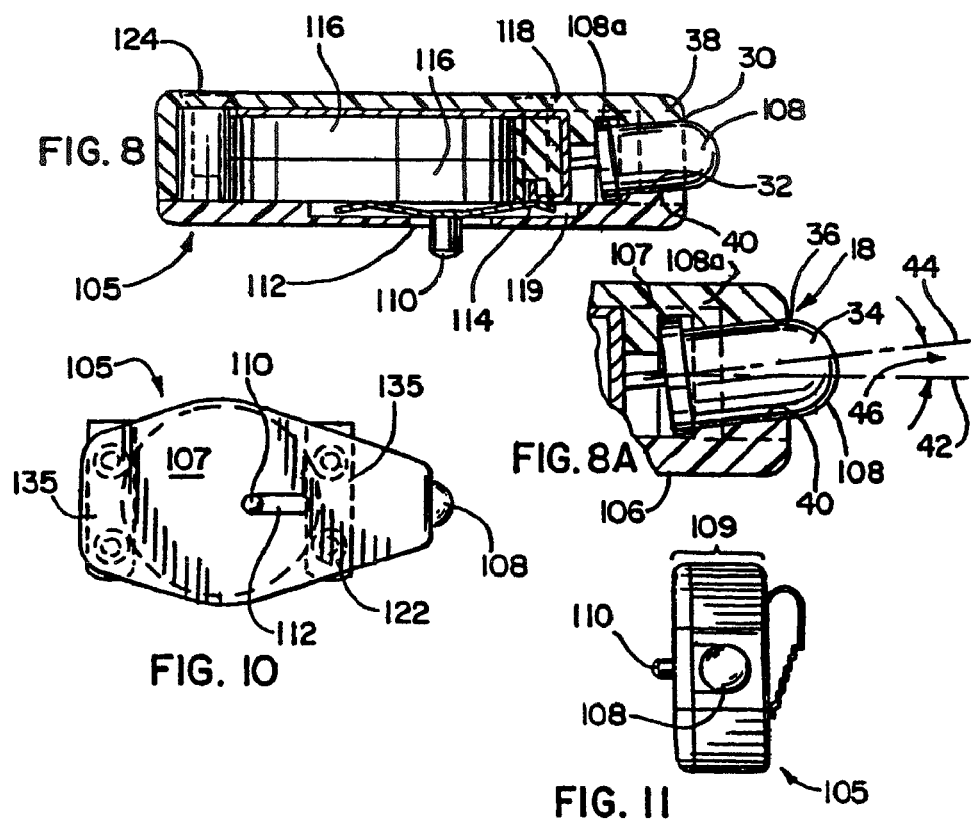

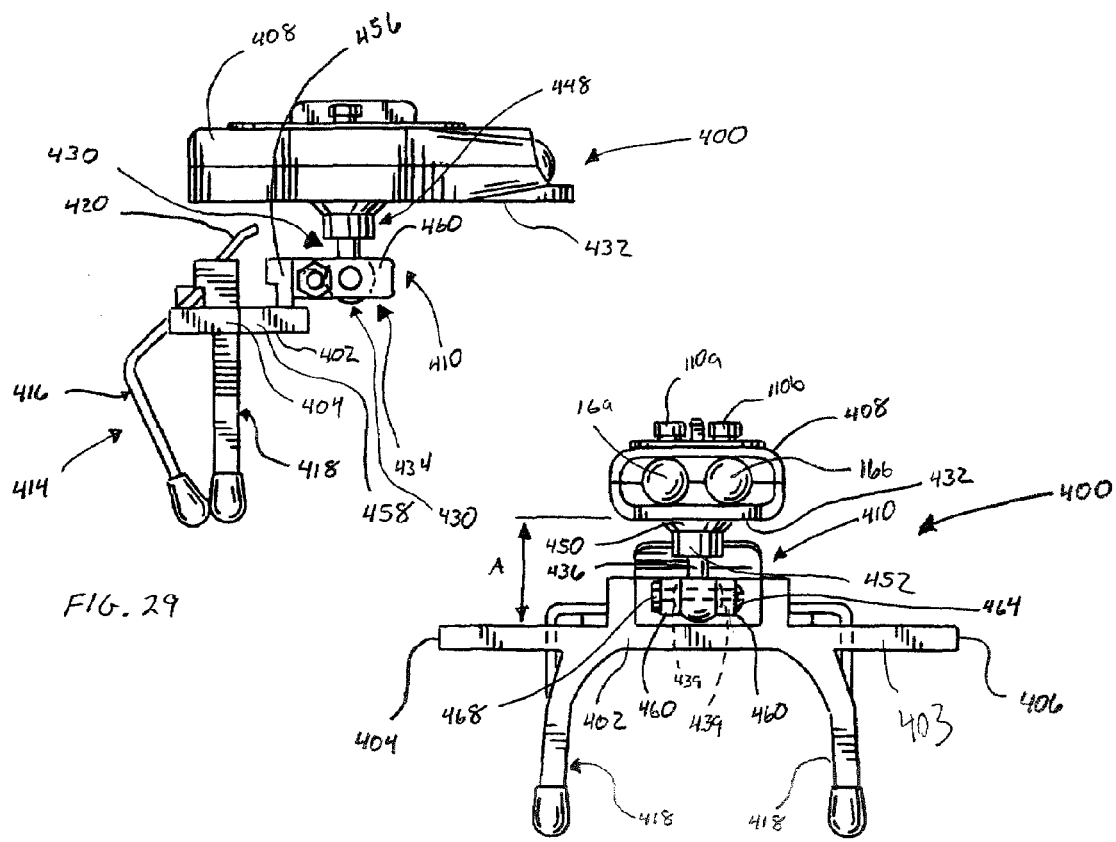
FIG. 29
FIG. 30
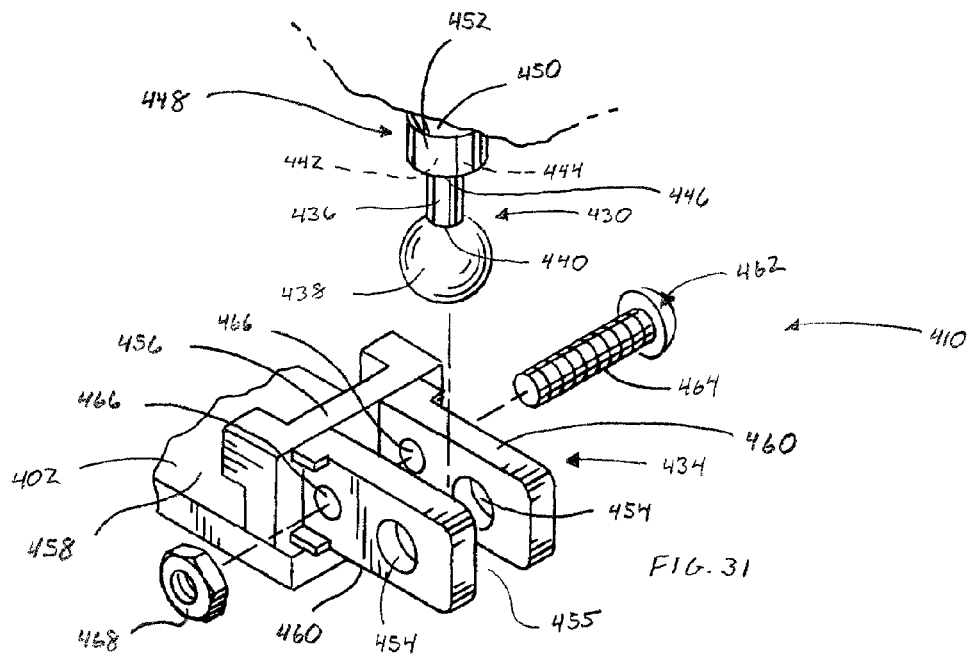
FIG. 31

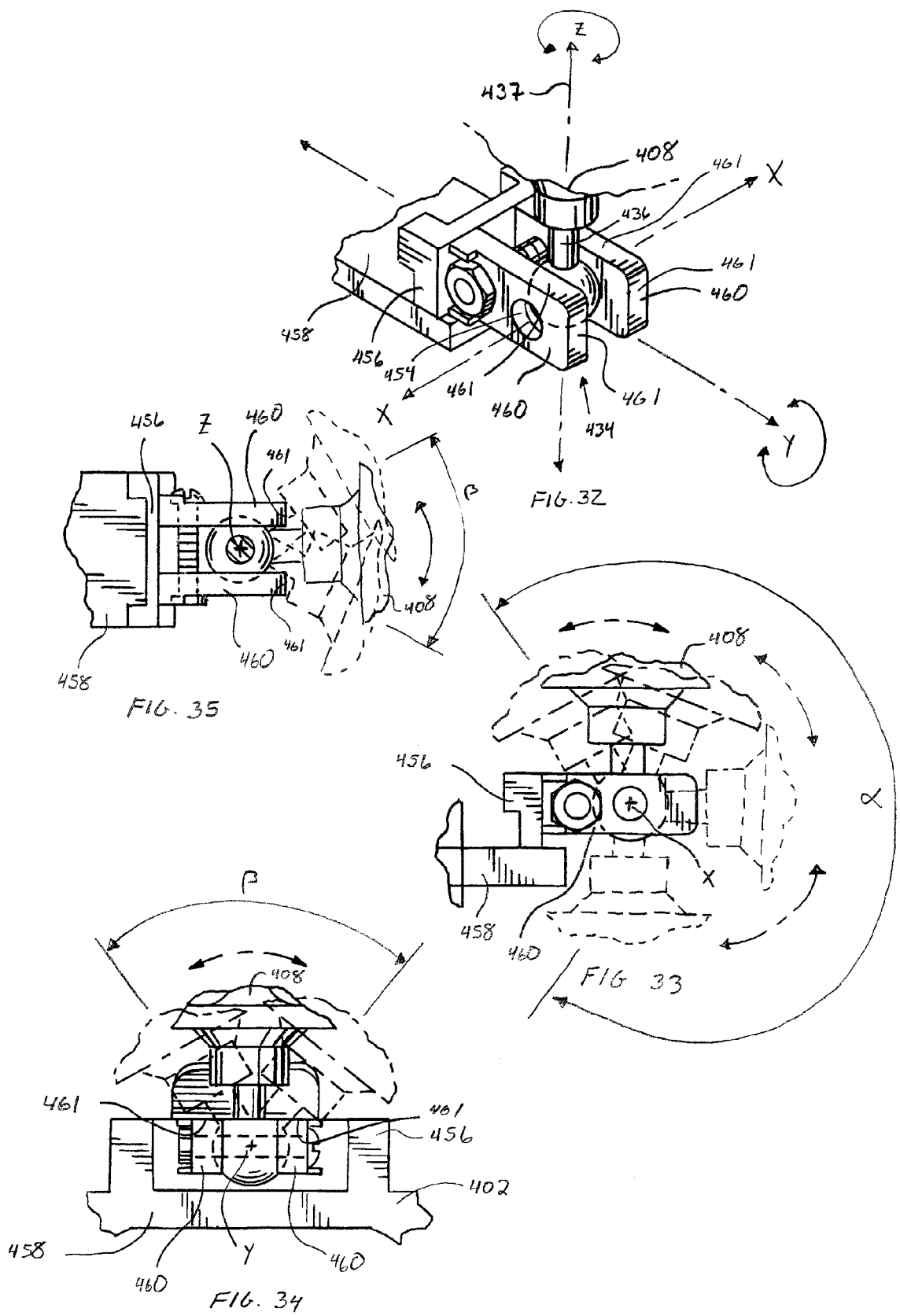

CLIP-ON LIGHT APPARATUS

CROSS-REFERENCE TO RELATED APPLICATION

This application is a continuation-in-part of prior application Ser. No. 10/571,796, filed Mar. 15, 2006, which is a national filing of International Application PCT/US02/35665, filed Nov. 7, 2002, which is a continuation-in-part of application Ser. No. 10/145,595, filed May 14, 2002, now issued U.S. Pat. No. 6,612,696, which is a continuation-in-part of prior application Ser. No. 10/006,919, filed Nov. 7, 2001, now issued U.S. Pat. No. 6,612,695, all of which are hereby incorporated herein by reference in their entirety.

FIELD OF THE INVENTION

The present invention relates generally to lighted devices and, more particularly, to lighted devices for being removably attached to a desired item.

BACKGROUND OF THE INVENTION

The use of lights and other illuminating devices with glasses are known. Generally, however, they have not been very well adapted for use with reading glasses. As is known, these types of glasses typically are not worn all the time, and are subject to being frequently taken off and put back on. On the other hand, when reading glasses are worn, they should be comfortable enough to encourage their use so that people are not avoiding their glasses and instead straining their eyes to read.

Incandescent light bulbs commonly have been proposed for use with lighted glasses. Unfortunately, such lighting devices generate a significant amount of heat. Smaller, less powerful incandescent lights still may make the wearer feel quite uncomfortable after even a short while due to the proximity of the light source and the wearer's face. Further decreasing the size of the incandescent lights, to the point where the wearer is comfortable, may cause light output to be very dim and therefore unusable for illuminating reading material that are held at distances optimal for reading.

For example, if reading distance after using corrective lenses for those in need of vision correction of ordinary size text, e.g. 10 or 12 point font, is optimally ten to eighteen inches from the eyes, a light that is capable of brightly illuminating the pages within that range of distances is necessary for ensuring comfort in reading in dimly lighted areas. However, a lower intensity light bulb, which may be preferable to reduce heat or increase battery life, may result in less than optimal lighting at the optimal reading distance, causing eye-strain and discomfort. In other words, the lower intensity of the light source will result in a decrease in the brightness of the light on the page so that the text to be read is only dimly lit.

The use of fiber optic lighting devices instead of incandescent light bulbs is known. In such devices, optical fibers are bundled together to create a light producing device. The nature of fiber optics is such that there is no heat generated at the point where the light is typically transmitted; that is, adjacent the user's temple. Unfortunately, such devices suffer from a rather major limitation. Namely, a very intense and powerful light source must be available to provide light to the optical fibers. As such, head gear such as worn by surgeons having a fiber optic lighting device must at all times stay tethered to a fiber optic light source, which severely restricts the mobility of the user and thus the ease of use of the headgear. A portable light source that stays connected to the fiber optic light head via electrical cables is less than desirable in terms of the need to be able to conveniently carry the light source, and the inconveniences associated with dangling connecting lines.

An additional problem that exists with fiber optic devices, as well as incandescent lighting devices, is rapid battery consumption. Incandescent light bulbs are known to consume large amounts of power. Similarly, a fiber optic device, since it requires a strong lighting source, also requires a large amount of power. As a result, the user is forced to change batteries often or stay tethered to a constant power source or light source.

Another disadvantage in prior art lighting devices is the manner in which surfaces are illuminated. Lighting devices used in the medical field generally produce a single fixed narrow beam of light to brightly illuminate the particular stationary body area on which the doctor may be operating. However, such a single narrow beam would not be particularly helpful in reading textual material as the beam would have to be continually shifted across the page being read. On the other hand, lights used with glasses generally tend to be very inefficient in their use of the light they generate as large amounts of light are cast beyond the field of view of the glasses. Adjustable lights are less than desirable as they require a user to make sure the lights are properly positioned each time the glasses are used.

Accordingly, there is a need for lighted glasses that are optimized for use in poorly lit or dim areas. More particularly, reading glasses having lights that are arranged to direct an optimum amount of light to the area where it is required most, i.e. the reading area, is needed. Further, lights that are very compact and lightweight, while still providing the necessary lighting strength and having a sufficiently long life for the power source that power these lights would be desirable.

SUMMARY OF THE INVENTION

In accordance with one form of the invention, lighted glasses, and preferably those adapted for reading which include corrective lenses, e.g. magnifiers, are provided to enable conventional sized text to be clearly read in dimly lit areas when held at a normal range of reading distances at which a user typically reads such material, such as between ten inches and eighteen inches from the lenses. High strength lights and light mounts therefor cooperate to light the reading area with a maximum amount of light provided in the reading distance range. More particularly, highly efficient and high intensity light emitting diodes (LEDs) are mounted in housings configured to fix narrow beams of light to be directed slightly inward toward each other so that the beams overlap in the reading distance range thus providing double the amount of light for reading over that provided by a single one of the lights. To this end, the housings are attached adjacent outer portions of the lenses so that the inwardly directed light beams light up the areas generally in front of the glasses, i.e. in its field of view, and which begins spaced forwardly therefrom, i.e. generally coinciding with the start of the reading distance range. Further, the small size and efficient nature of the preferred solid-state material, i.e. InGaN (indium gallium nitride), for the LEDs, allows very small power supplies to be used such as disc-shaped coin cell batteries for powering the LEDs which, in turn, allows both the light source and power source herein to be self-contained in a highly compact housing therefor. In this regard, the present invention also contemplates the provision of compactly sized lighting modules as described above that can be attached to reading or other glasses either removably or fixed in a more permanent fashion as described hereinafter, or to other items typically worn as headgear such as hats or the like.

The beams of light from the LEDs generate conical-shaped lighted areas such that upon intersection they cooperate to form a conical overlapping lighted area in which the brightness of the light is effectively doubled over that provided by a single LED. The conical overlapping lighted area increases in size as distances increase from the lenses. As is known, light tends to dissipate the further it is from its source. The overlapping conical lighted area is such that the peripheral areas in the field of view of the lenses that do not receive the double light strength of the overlapping light beams are closest to the lenses where light dissipation has its least effect in the reading distance range, whereas the overlapping lighted area increases in size further from the lenses with a corresponding decrease in the single light strength peripheral areas on either side of the cone of overlapping light. Thus, as light dissipates and distances increase from the lenses, the lighting provided will not suffer as the double light strength of the overlapping conical region of light will more than make up for the effects of light dissipation in the reading distance range.

To achieve the optimum amount of light flooding in the reading area, the light housings have surfaces configured to orient the central axis of the conical light beams in a direction that is canted slightly inward with the beams directed toward each other. The preferred canting of the narrow light beams which in the preferred and illustrated form are cones forming angles of twenty degrees is such that the cone axis has a fifteen degree angle with a reference line extending straight forwardly from the lenses. The lenses are preferably magnifiers of a predetermined diopter rating selected by a user so that conventionally sized text such as ten or twelve point font can be clearly read at distances ranging from between approximately ten and eighteen inches forwardly of the user. And it is in this distance range where the overlapping cone of light is formed by the conical light beams canted inward toward each other, as described. In this way, the present lighted reading glasses are provided with lights whose light beams are directed in a carefully coordinated manner with the vision correction provided by the corrective reading lenses so that the amount of light is maximized where it is needed most, i.e. in the field of view of the lenses and within the range of distances at which conventional sized printed text is most commonly read.

In one form, the glasses include temple arms that extend rearwardly from the outer portions of the lenses with the housings attached to the arms toward the forward ends thereof. The temple arms can be opened for use or folded when not in use. With the temple arms opened, the housings are each oriented to project light therefrom forwardly inwardly and toward the light emanating from the housing attached on the other arm. The temple arms toward their forward ends typically will extend substantially straight rearwardly generally normal to the lens frame portions so that the longitudinal axis of the housing is likewise in a normal orientation to the lens frame with the mounting surfaces of the housing configured to be canted inwardly therefrom to direct the light beams as earlier described. Should the configuration of the temple arms and/or housings vary from that described herein, the mounting surfaces can be configured to adapt accordingly such that the light beams are inwardly directed as desired.

The preferred LEDs herein are a small lightweight device that provides a very bright light, while consuming very little power. As such, the batteries enclosed in the housing are small and do not need to be changed as frequently as devices that utilize incandescent lights or fiber optics, which require large batteries. The LEDs provide a relatively narrow beam of light that can be well focused in a particular direction. For example, if two light modules are mounted on a pair of glasses, the LEDs in each module are positioned such that the cones of light produced by the LEDs in the light modules begin intersecting at a point closely adjacent to or coinciding with the start of the range of ideal reading distances. As such, the illuminated reading portion receives the brightest light possible since the intersection of both cones of light are trained on that area. Another advantage of using the high intensity LEDs is that because they consume such a small amount of power, virtually no heat is dissipated. Therefore, a user is able to wear eyeglasses having the light modules mounted thereon, for longer periods of time without suffering from heat and without being bothered by the weight of the devices.

In another form, the light modules are provided with spring clips that are attached to the light module housing. The spring clips are preferably a resilient material such as metal or sturdy plastic. The spring clips enable the light module to be removably attached to any pair of eyeglasses. Alternatively, the modules can be fixed at ends of a clip-on frame with a clip mechanism intermediate the ends for releasably securing the clip-on frame to eyeglasses in the general area of the nose bridge and adjacent lens portions thereof.

In still another form, the lights such as provided in the aforedescribed light modules are fixedly mounted to a clip-on light apparatus for being removably secured to eyeglasses. Preferably, the clip-on frame is adjustable so that it can be fit onto differently sized eyeglasses. More particularly, the frame is an elongate spacer frame having end portions to which lights are mounted. An adjustment assembly or draw spring assembly of the spacer frame spring biases the end portions toward each other. At the end portions, retainer members are configured to grip onto the lenses to position the lights adjacent thereto. In particular, the light modules are mounted at the corresponding temple area of the clip-on glasses to enable the LEDs in the light modules to project light in the manner described above. To this end, the lights can include high intensity LEDs that are mounted in the light modules which orient the LEDs to project light at an inward cant relative to each other so the maximum amount of light is trained on the reading area, as previously described.

In another embodiment, a compact clip-on light apparatus is provided including a light module, a clipping mechanism, and a polyaxial coupling joint between the light module and the clipping mechanism. The polyaxial coupling joint permits the light module to be pivoted about a plurality of axes for directing light in a desired direction. The polyaxial coupling joint provides advantages over prior art lighted glasses or prior clip-on light devices that only permit pivoting of the light source along a single pivot axes. The polyaxial coupling joint, on the other hand, permits light from the light module to be directed in a plurality of directions without necessitating that the item to which the light module is attached be adjusted or shifted. Preferably, the polyaxial coupling joint is configured so that the light module is pivotally rotatable about one pivot axis to provide even greater freedom of light positioning. The clip-on light apparatus with the polyaxial coupling joint, therefore, is more versatile than prior clip-on lighting devices, especially when coupled to eyeglasses or headgear, because the direction of the light can be changed by pivoting or rotating the light in one of a variety of directions relative to the frame instead of the user needing to turn their head or reposition the device.

In a preferred form, the clip-on light apparatus includes a retention device that is arranged and configured to restrict movement of the light module about a pivot axis at the polyaxial coupling joint. Most preferably, the pivot axis for which the retention device is operable is a variable pivot axis that itself is pivotal in a plane with the module pivoted laterally to either side of the plane. The retention device is operable to generate a holding force at the coupling joint so that the amount of pivoting of the light module about the pivot plane can be controlled. Depending on whether the retention device is loosened or tightened, more or less pivoting of the light module about the pivot plane can occur. The resistance to pivoting about the pivot plane via the retention device can generate minimal play within the polyaxial coupling joint about the pivot plane. For example, tightening the retention device provides increased holding forces on the polyaxial coupling joint resulting in more resistance to pivoting of the light module laterally about the pivot plane. Conversely, loosening the retention device permits greater freedom of movement in the polyaxial coupling joint due to lower holding forces directed on the polyaxial coupling joint.

BRIEF DESCRIPTION OF THE DRAWINGS

FIG. 1 is a perspective view of lighted reading glasses in accordance with the present invention showing the glasses used to read material held at a normal reading distance range;

FIG. 2 is a side elevational view of the reading glasses of FIG. 1 showing a lighting module attached to a forward end portion of one of the temple arms of the glasses;

FIG. 3 is a plan view of the glasses of FIG. 2 showing a light switch shifted to activate the lights to generate cones of light emanating therefrom;

FIG. 6 is a side elevational view of the light module showing the coin cells in phantom and the tapered configuration of the housing from the widest diameter to hold the coin cells therein;

FIG. 7 is a front elevational view of the light module showing the thin configuration of the housing;

FIG. 8 is a cross-sectional view taken along line 8-8 of FIG. 6 showing light mounting surfaces for orienting the LED to project light at an oblique angle to a longitudinal axis of the housing;

FIG. 8A is an enlarged fragmentary view of the forward portion of the module to show more clearly the preferred angle at which the LEDs are mounted in the housing;

FIG. 10 is a side elevational view of the light module having spring-clips for being removable attached to the glasses;

FIG. 11 is a front elevational view of the light module of FIG. 10 showing a ridged surface on a resilient arm of one of the clips;

FIG. 29 is a side elevational view of the clip-on apparatus of FIG. 27 showing the clipping mechanism including an actuator lever that operates one of a pair of clamp arms;

FIG. 30 is a front elevational view of the clip-on apparatus showing the light module including a housing and a pair of LEDs contained in the housing;

FIG. 31 is an enlarged exploded view of the polyaxial coupling joint showing a pair of support arms having a pair of socket openings therein, a ball configured to be received in the socket openings, and a retention device that draws the support arms toward each other;

FIG. 32 is a perspective view similar to FIG. 31 but with the polyaxial coupling joint assembled showing a plurality of axes about which the light module is pivotal;

FIG. 33 is a side elevational view of the polyaxial coupling joint showing a mounting portion of the light module pivoted to different positions about one of the pivot axes;

FIG. 34 is a front elevational view of the polyaxial coupling joint showing the mounting portion of the light module pivoted to different positions about a pivot plane; and FIG. 35 is a bottom plan view of the polyaxial coupling joint showing the mounting portion of the light module pivoted to different positions about the pivot plane.

DETAILED DESCRIPTION OF THE PREFERRED EMBODIMENT

As shown in drawings for purposes of illustration, the invention is embodied in lighted reading glasses 5 which enable a user wearing the glasses 5 as shown in FIG. 1 to clearly read conventionally sized printed text 10, e.g. ten or twelve point font, held in a range of distances suitable for reading such text sizes where the reading is occurring in poorly or dimly lit areas. In this regard, the present lighted reading glasses 5 are ideally suited for use in areas that normally require a user to turn on a light before reading can occur but where doing so is less than desirable, such as in a car or when reading in bed with another present who is trying to sleep while you read.

The lighted glasses 5 which as stated above are preferably reading glasses 5 will include lenses 12 of light transmissive material configured to refract light to correct for defects in vision due to errors of refraction in the human eye and thus, at least one of the lens surfaces 14 will be curved to precisely correct for the defect being addressed in a particular individual that wishes to use the lighted reading glasses 5 herein. A variety of lens types may be utilized including concave, convex, plano-convex, cylindrical, compound lenses and/or bi, tri, or tetrofocal lenses, although the reading glasses 5 are preferably adapted for use by those who are farsighted so that convexly configured lenses 12 will typically be employed. Further, although the reading glasses 5 can be provided with prescription lenses 12, from a cost standpoint the lighted glasses 5 are preferred for use with lower cost magnifier lenses 12 that have a well-defined diopter rating. In this regard, the lenses 12 can be offered with nine different diopter ratings from 1.00 up to 3.00 in intervals of 0.25 therebetween. Alternatively, the lenses 12 can be non-refractive for people who do not need vision correction but still want to read in the dark via the lighting provided by the glasses 5 herein.

Figure 9:
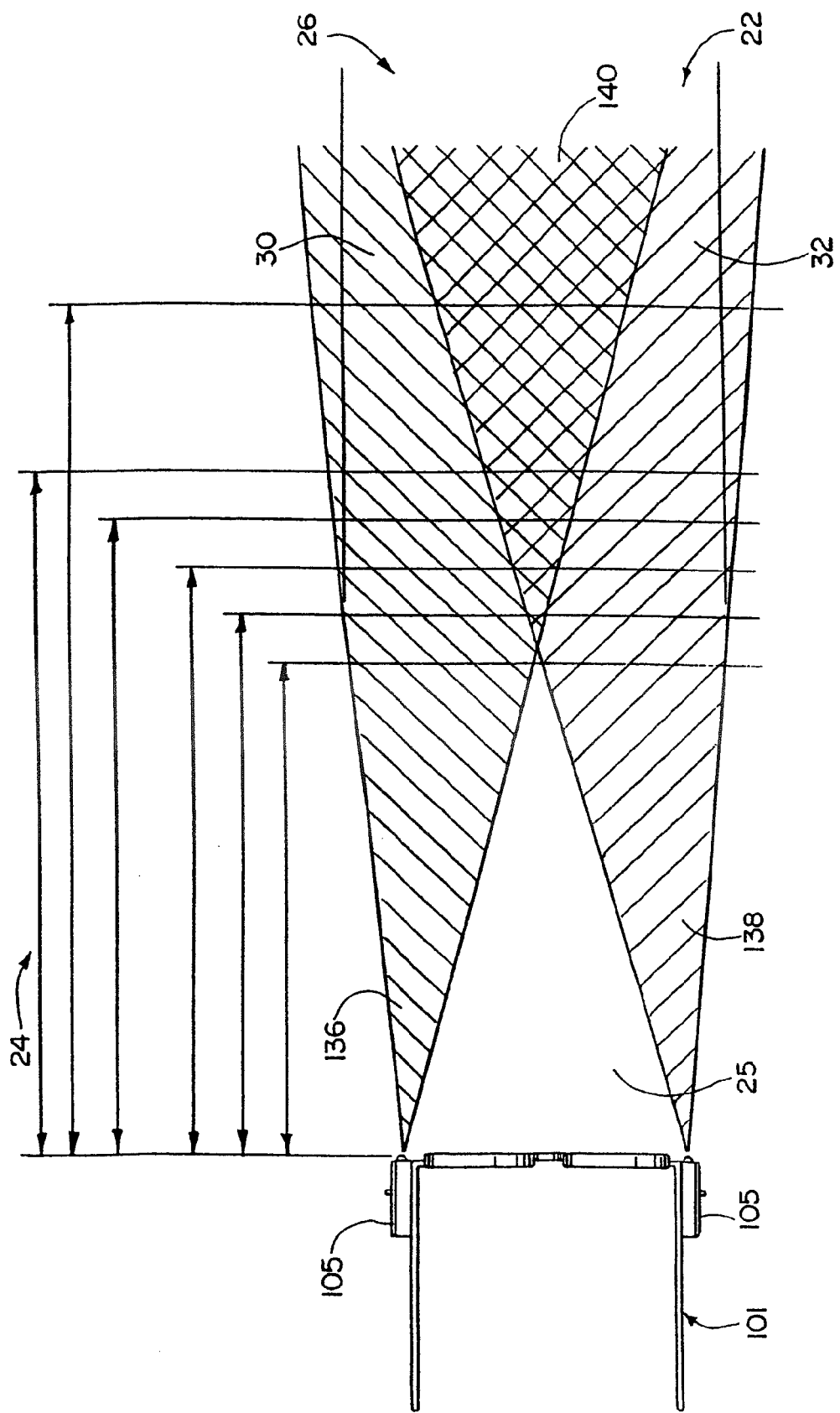
FIG. 9 is a diagramatic view of the lighted glasses showing the respective inwardly directed cones of light produced by each of the light modules and the overlapping lighted area they create in the reading distance range.

With the reading glasses 5 on, the user will be able to read in dark or dimly lit areas via lights 16 that are on the glasses 5 attached by way of respective light mounts 18 therefor. The light mounts 18 fix the predetermined lighted areas 20 to be oriented so that they overlap and create an overlapping lighted area 22 which has double the amount of light and thus significantly increased brightness over that provided by a single one of the lights 16. As best shown in FIG. 9, the overlapping lighted area 22 is disposed in the predetermined reading distance range generally designated 24 by the direction afforded to the lights 16 via their light mounts 18. This range for a normal functioning eye or using an appropriate corrective lens for those requiring vision correction for reading ten or twelve point font with a sufficiently large or wide field of view will be approximately ten to eighteen inches in front of the lenses 12.

The lights 16 are preferably high intensity lights or LEDs 108 that form their lighted areas 20 as narrow light beams in the shape of respective cones 136 and 138 of light directed inwardly toward each other, as shown in FIGS. 3 and 9. In this manner, the point of intersection 48 will be closely adjacent or substantially coincident with the start of the reading distance range 24 and the overlapping area 22 will likewise take on a conical shape 140 and be maximized in size in the range 24. There is also a proximate conical area 25 right in front of the glasses 5 that does not receive light. However, this unlighted area 25 is of little consequence as it substantially falls before the start of the reading distance range 24.

By canting the light beams 136 and 138 inwardly, little light is wasted on areas that are outside the effective field of view, generally designated 26, of the glasses 5. Further, the conical overlap area 140 that receives double the amount of light increases in size with increasing distances from the lenses 12. By contrast, the peripheral areas 30 and 32 on either side of the double-lit overlap area 140 become smaller with increasing distance from the lenses 12. Since light dissipation can become an issue as distances increase from the light source, the increasing size of the double-lit area 22 in comparison to the decreasing size of the single-lit areas 30 and 32 provides a significant advantage in having a very well-lit reading area with an efficient use of the light generated by the LEDs 108 herein. Further, the fixed canting of the beams 136 and 138 allows a user to put on the glasses 5 and know that they will be able to begin reading even in dimly-lit areas by simply turning on the lights 16 without requiring that they be adjusted for focusing them on the material to be read.

The light mounts 18 are preferable compactly sized housings 109 for containing the high intensity LEDs 108 and at least one, and preferably two, small disc-shaped battery power supplies 116 in a space savings manner therein. The housings 109 can be constructed of two halves or cover members 106 and 107 each with mounting surfaces generally designated 30 and 32 configured to orient the LED dome lens 34 in forward opening 36 of the housing 109 such that the light beam cones 136, 138 emanate in the desired inward direction. As best seen in FIGS. 7, 8 and 8A, the surfaces 30 and 32 can be formed integrally with their respective housing portions 106 and 107 such as on raised ribs 38 and 40. As shown, the surfaces 30 and 32 are each inclined to extend in the same direction relative to longitudinal axis 42 of the housing 109 such that they extend transversely and at an oblique angle thereto. In this manner, when the housing portions 106 and 107 are attached, the ribs 38 and 40 cooperate to capture the LED dome lens 34 in a canted orientation thereof relative to housing axis 42. Accordingly, with the LEDs 108 switched on, the axis 44 extending centrally through or bisecting the light beam cones 136 and 138 will generally extend parallel to the housing mounting surfaces 30 and 32 and at an oblique angle to the axis 42.

In the preferred and illustrated form, the eyeglasses 5 including temple arms 104 are constructed such that with the arms 104 opened, their forward end portions 104a will extend substantially normal to the general plane of the eyeglass lenses 12 and to any frame portions that may be included thereabout. Further, the housings 109 are constructed so that when attached flush to the arm forward end portion 104a as shown in FIG. 3, the housing axis 42 will extend parallel to the forward end portion 104a and straight forwardly from the glasses 5. With the preferred solid state material for the LEDs 108 as described hereinafter, they will generate a narrow light beam cone 136, 138 of twenty degrees. For this narrow cone 136, 138, the oblique inward cant angle 46 is preferably approximately fifteen degrees so that the point 48 of intersection where the overlap lighted area 22 begins is centrally disposed between the lenses 12 and spaced forwardly therefrom approximately at the start of the reading distance range 24. This inward canting of the light beam cones 136 and 138 also minimizes the amount of light that is projected to lateral areas outside the field of view 26 forwardly of the glasses 5.

The LEDs 108 are preferably high-intensity white LED, such as manufactured by Chicago Miniature Lamp, Inc., of Hackensack, N.J., part number CMD333UWC-ND. Similar types of LEDs are available from a variety of manufacturers and such LEDs would also be acceptable for use in the light module 105. A particular advantage of using the described high-intensity LEDs is the ability of the LEDs to provide large amounts of bright light while consuming significantly less power than incandescent light sources and fiber optic devices. In particular, the LED 108 provides a typical 2300 mcd light output using only 20 mA of power. This allows for significantly extended battery life using inexpensive and lightweight batteries. A further advantage of this type of LED is the relatively narrow viewing angle of approximately 20 degrees. This allows the light output to be directed in a very precise manner, making it ideally suited for use in the present invention. Referring in particular to FIG. 3, it can be seen that the angle of the LED 108 causes the cone of light to be emitted at a specific angle so that the light is directed slightly inward toward the portion being read and thereby avoiding scattering of light outwards and particularly outside the field of view of the glasses 5.

Figure 4:
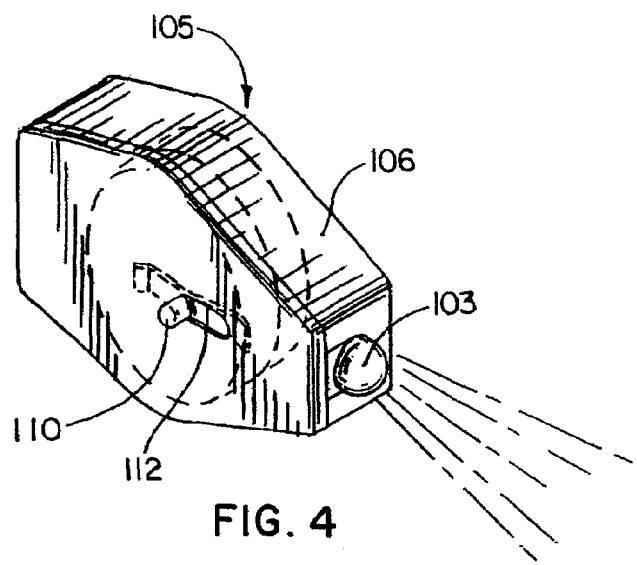
FIG. 4 is a perspective view of the light module showing the compact configuration of a housing of the module with a slot opening for the switch and a forward opening for the light in the form of an LED.

Turning now to FIG. 4, the light module 105 is shown in isolation from the eyeglasses. As can be seen in greater detail, the light module 105 houses a switch 114 having an actuator projecting portion 110. The projecting portion 110 is designed such that a user's thumb or finger can quickly and easily engage the projecting portion 110 to push the switch 114 for sliding in either one of two directions to turn the light module off and on. The elongated slot 112 is sized such that the switch 114 can be moved only a preset distance, thereby enabling the on and off functions to be accomplished with a minimum of motion. When the switch 114 is moved to the "on" position, a set of batteries 116 energize the LED 108. Similarly, when the switch 114 is moved to the "off" position, the connection between the batteries 116 and the LED 108 is broken and the LED 108 is turned off.

Figure 5:
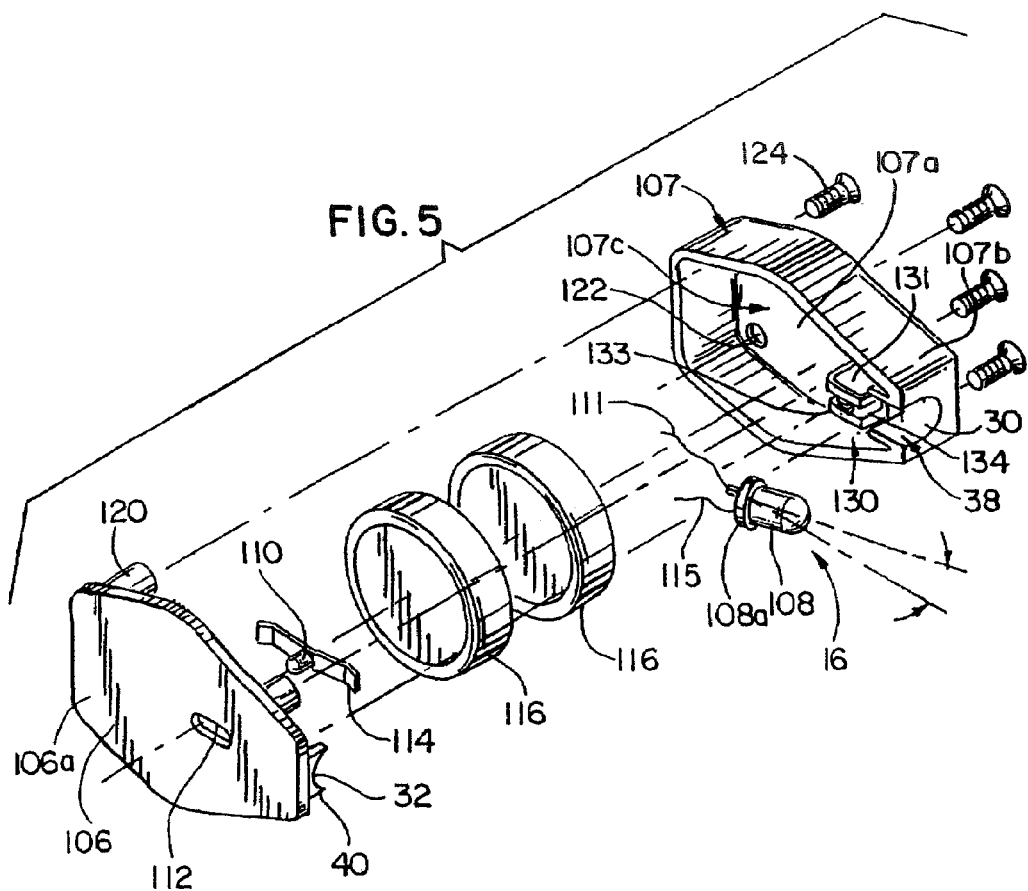
FIG. 5 is an exploded view of the light module of FIG. 4 showing a pair of coin cell batteries used to power the LED.

Referring to FIG. 5, an exploded perspective view of the light module 105 is shown. The light module 105 comprises a housing 109 that is preferably constructed of a lightweight material, such as plastic, to provide the greatest amount of comfort to the wearer, while still being a cost-effective product. The housing 109 includes a first cover member 106 and a second cover member 107. The second cover member 107 is formed with a main flat wall 107a from which upstanding walls 107b extend from the periphery thereof to form an interior space 107c in which the switch 114, the batteries 116 and the LED 108 are disposed. The fastening devices 124, which may be self tapping screws among others, are used to fasten the first cover member 106 as a lid onto the second cover member 107.

The first cover member 106 is formed with an elongated slot 112 cut out of the main flat wall 106a, several integral projecting bosses 120 that can be internally threaded for receiving fastening members or screws 124 and an integral LED positioning member or raised rib 40. The LED positioning member 40 extends toward the cover 107 and has a concave surface 32 that cooperates with curved surface 30 of the cover member 107 for capturing the LED dome lens 34 at the desired angle 46 to axis 42 (FIG. 8a). As described above, the elongated slot 112 is designed to receive the projecting portion 110 of a switch 114 such that the projecting portion 110 extends slightly outside the first cover member 106 and is accessible by a user's finger or thumb. The cover member 106 also is formed having a slot 119 (FIG. 8) to form a housing for the switch 114 when the light module is fully assembled.

The LED 108 includes anode 111 and cathode 115 leads that are used to energize the LED 108. In addition, the anode 111 and cathode 115 leads are physically configured to also enable the LED 108 to be securely held in position within the light module 105. The cathode 115 lead, which is generally the shorter of the two leads, is trimmed further to a size suitable for engaging an aperture 113 in a box shaped member 130. The trimmed cathode 115 lead is bent into a curved hook configuration to behave as a resilient spring clip when mounted into the light module 105; and the anode lead is left in its original form and engages a second aperture in the box shaped member 130, which enables the anode 111 lead to extend into the open portion of the second cover member 107, as further discussed below.

The second cover member 107 includes a LED positioning member or rib 38 having curved surface 30 formed thereon for cooperating with surface 32 to capture the LED dome lens 34, as previously described. A lead guide assembly 130 is disposed within cover member 107. The guide assembly 130 channels or guides the anode 111 lead and the cathode 115 lead into their respective appropriate positions for conducting and switching functions. The guide assembly 130 includes an extending sidewall 131 and an extending support structure 132. The support structure 132 includes first 133 and second 134 indents and a block 135 oriented between the first 133 and second 134 indents. When the LED 108 is placed into position in the guide assembly 130, the anode 111 lead is placed into the channel between the extending sidewall 131 and extending support structure 132. A large portion of the anode 111 lead extends beyond the sidewall 131 and into the cover member 107 opening. The cathode 115 lead, which is in a bent hook configuration, is placed into the support structure 132 such that the portion of the cathode that is connected to the LED 108 is situated in the second 134 indent and the hooked portion engages the first 133 indent. The block 135 forces part of the cathode 115 lead to extend beyond the support structure 132 to enable contact between the batteries 116 and the cathode 115 via the switch 114.

The second cover member 107 also includes several apertures 122 for receiving the fastening devices 124. The fastening devices 124 are inserted into apertures 122 and engage the fastening receiving members 120 of cover member 106. The apertures 122 in the second cover member 107 are preferably countersunk such that the heads of the fastening devices 124 sit flush with the surface of the second cover member 107. Furthermore, by providing a standard Phillips or slot headed fastening device, a user is able to gain access to the interior of the light module using a simply, commonly found household screwdriver. Once inside, the user self-services the light module 105 and, in particular, replaces the batteries 116 when they are exhausted.

The batteries 116, because of the low power consumption of the high-intensity LEDs 108, may be any commonly found small form factor batteries, such as three volt coin cells manufactured by Panasonic Corporation of Japan, part no. P189D. To this end, the disc-shaped batteries preferably have a diameter of slightly greater than three-fourths of an inch and a width of approximately one-eighth of an inch so that two batteries 116 can be stacked in a compact fashion. Accordingly, with the small LED 108 and the small and thin batteries 116, the housings 109 can be constructed in a very compact fashion. By way of example and not limitation, the main housing walls 106a and 107a have a maximum width of less than approximately one-inch. Since neither the batteries 116 nor the LED 108 is particularly long, and the stroke of the switch 110 in minimized as previously described, the length of the housing 109 can be minimized to be on the order of approximately one and one-half inches. Finally, since the batteries 116 are so thin, the depth of the housing 109 can be sized to be slightly greater than the thickness of the two stacked disc batteries 116 or less than approximately one-half inch.

When assembled, the batteries 116 make contact with the anode or elongated portion 111 of the LED 108. The batteries 116 are stacked together such that the negative terminal of the first battery is an electrical contact with the positive terminal of the second battery. The positive terminal of the first battery 116 is then placed in electrical contact with the elongated portion 111 of the LED 18. The switch 114 which is constructed of an electrically conductive lightweight metal strip rests solely on the negative terminal of the second battery when the light module is not producing light, resulting in an open circuit. When the switch 114 is placed in its "on" position, an electrical connection is created between the negative terminal of the battery 116 and the depending hooked portion 115 of the LED 108. Thus the circuit from the positive terminal of the battery 116 to the LED 108 is completed using the switch 114, and the LED 108 illuminates. The projecting portion 110 may be integrally formed as part of the metal strip or may be a plastic or metal projection that is fastened at an appropriate position in the body of the switch 114. The body of the switch 114 is constructed such that the metal strip includes one or more inclines formed by bends in the metal strip of the switch. The inclines are sized to cause the switch 114 to fit relatively tightly between the battery and the housing much like a spring, thereby enabling the switch to maintain its on or off position into which it has been placed.

Referring to FIGS. 8 and 8A, the light module is shown in its assembled form. The LED positioning member 40 of the cover member 106 presses against the body of the LED 108 and pushed the LED 108 into a canted position within the housing 105. A particular advantage in such a configuration is that the LED is able to project light at a precise pre-determined angle. Referring in particular to FIG. 8A, it can be clearly seen that the base 108a of the LED 108 helps to hold the LED 108 in place within the housing 105. Furthermore, it also clearly can be seen that the LED positioning member 40 is angled to a degree such that the top of the LED 108 is pushed against the second cover member 107 and particularly the positioning rib 38 thereof.

Turning now to FIG. 9, the eyeglasses 101 having the light modules 105 mounted thereon are shown in operation. The canted positioning of the LEDs 108 in each of the light modules 105 cooperate to create an overlapping zone 140 of their respective cones of light 136, 138 in the desired reading range. In particular, because of the twenty degree viewing angle of the LEDs 108, and their precise cant within the housing 107, the overlap area 140 occurs within a range of distances that is ideally suited for reading after the use of corrective lenses in the eyeglasses for those in need of vision correction. As a result, the incidence of stray light is reduced and the amount of light illuminating the reading surface is maximized, as previously described. The eyeglasses themselves may be of any configuration. For example, the lenses of the eyeglasses may or may not have frames surrounding the exterior edges of the lenses. Furthermore, the eyeglasses may have bridges for interconnecting the inner portions of the lenses of for interconnecting the inner portions of the lens frames, depending on whether the eyeglasses have frames.

Referring to FIGS. 10 and 11, the light module 105 is shown with a pair of spring clips 135 attached to the second cover member 107. The spring clips 135 may be manufactured of any strong resilient materials such as a high impact ABS plastic or metal, such as stainless steel. The spring clips 135 may be formed having slight ridges 135 to more securely hold the light modules 105 in place. The spring clips 135 enable the light module 105 to be retrofitted or removably attached to any eyeglasses. Therefore, the present invention is not limited to eyeglasses having pre-mounted light modules that are more perfectly fixed to eyeglasses as by fasteners or the like requiring tools for their removal. Rather, any existing eyeglass frames maybe fitted with the light modules. Referring to FIG. 10, it can be seen that the spring clips 124 are fastened onto the housing 109 using the same apertures 120 and fastening devices 124 as described above. Therefore, a manufacturer of the light module obtains a cost benefit by using the same light module 105 platform, but easily configuring it in a number of different ways, depending on the type and configuration of the lighted eyeglasses.

Figure 12:
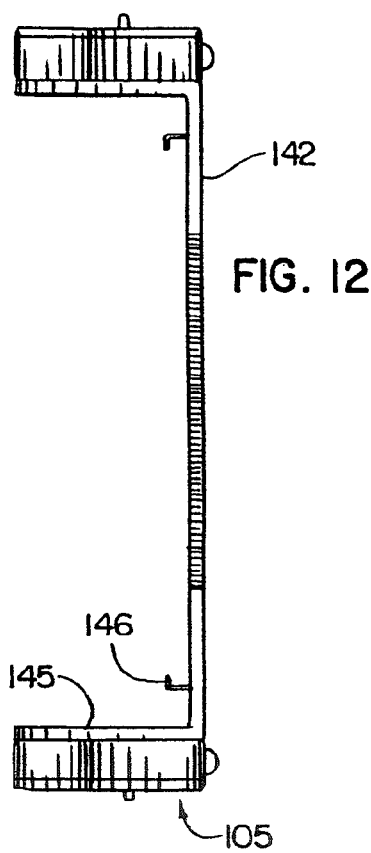
FIG. 12 is a plan view of the light module fixed to a frame to be clipped onto glasses.
Figure 13:
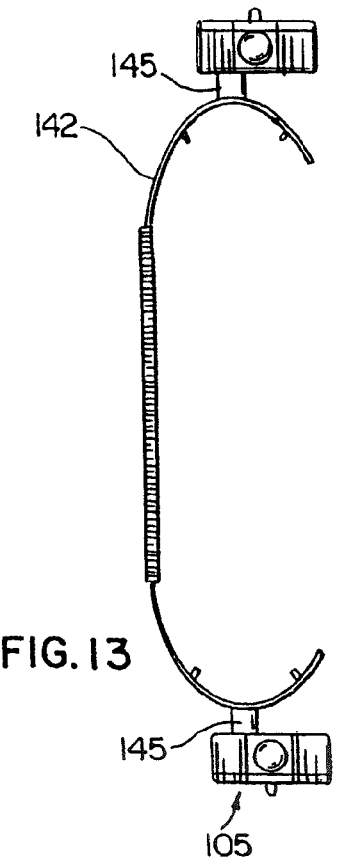
FIG. 13 is a front elevational view of the lighted clip-on frame of FIG. 12.
Figure 14:
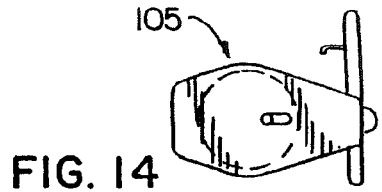
FIG. 14 is a side elevational view of the lighted clip-on frame of FIG. 12.
Figure 15:
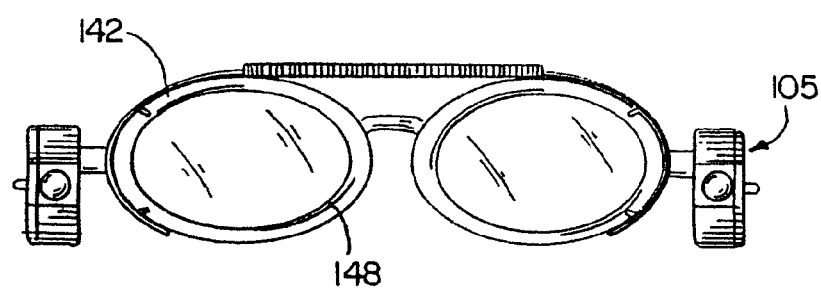
FIG. 15 is a front elevational view of the lighted clip-on frame removable attached to a pair of spectacles.

Turning now to FIGS. 12, 13, 14, and 15, the lighted eyeglasses of the present invention is shown in another aspect. The light module 105 is carried by clip-on glasses 142 having module mounts 145. Referring in particular to FIG. 12, the module mount 145 runs along the length of the light module 105 to provide stability and support to the light module 105. The module mount 145 is attached to the frame at the outer ends of the clip-on glasses and extends rearwardly therefrom. The light modules 105 are mounted on the light mounts 145 such that the respective LEDs 108 project light in a generally forward angled direction. As shown in greater detail in FIG. 13, the module mount 145, although running the entire length of the light module 105, is a relatively narrow strip. This ensures that the device remains light weight and retains its aesthetically pleasing design. As shown in FIG. 14, each of the light modules 105 is attached to a module mount in the temple area of the clip-on glasses 142 and is oriented such that the module mount can not be seen from the side. FIG. 15 shows a representative appearance of the clip-on glasses, having the light modules 105 mounted thereon, attached to a pair of standard eyeglasses 148.

Figure 16:
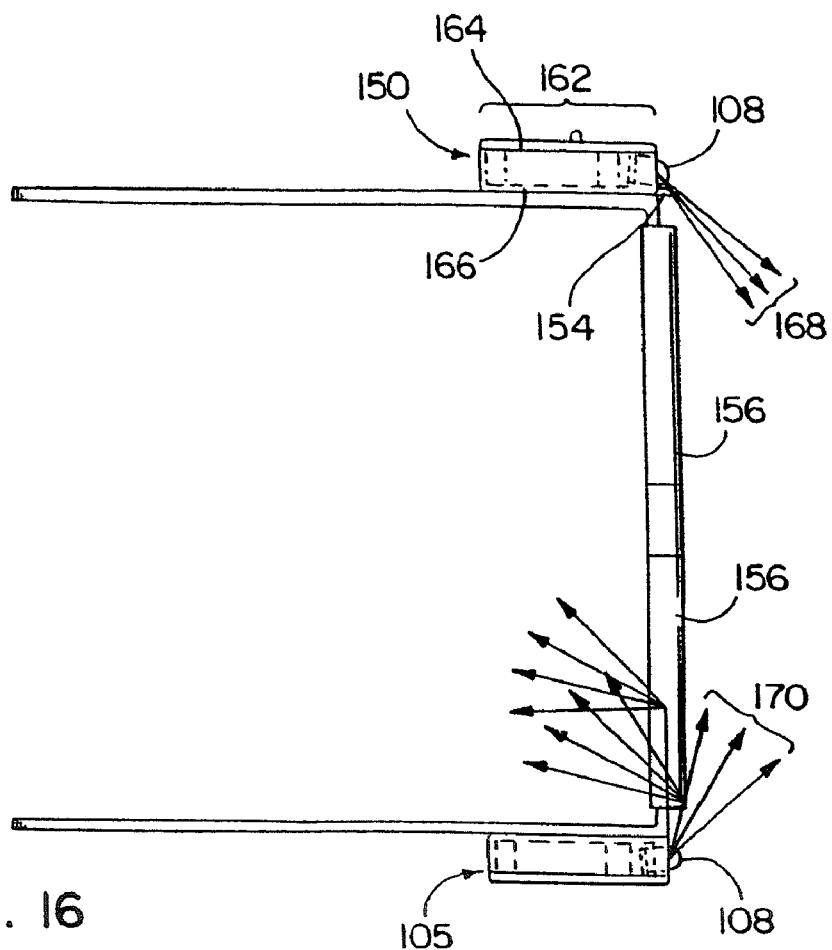
FIG. 16 is a plan view of the lighting modules modified so that each include a blinder extension integral with the housing and disposed between the LEDs and the adjacent lenses.
Figure 17:
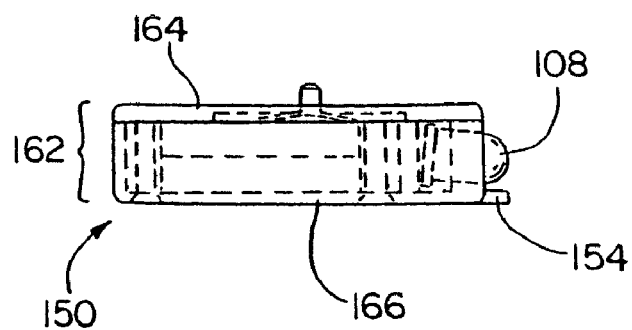
FIG. 17 is an enlarged elevational view of the lighting module of FIG. 16.

Referring now to FIGS. 16 and 17, a light module is shown having an integrally formed blinder extension 154 to eliminate glare. An advantage of such a light module is that reducing glare also reduces eye-fatigue that a wearer may suffer when wearing eyeglasses with the light modules for extended periods of use. Although both types of light modules work equally well, individuals with sensitive eyes may prefer the light module with the blinder extensions. By way of example only, and to illustrate the difference between the two light modules, eyeglasses are shown mounted with a first light module 150 with an integrally formed blinder extension 154 on one temple area of the eyeglasses and a second light module 105 (as generally described above) mounted on the other temple area of the eyeglasses.

Lighted eyeglasses having the light module 105, mounted in the manner described above may, in certain instances, create glare that is perceivable by the wearer. As shown, stray or incident light rays 170 that are emitted by the LED 108 may project towards the lens 156 of the pair of eyeglasses 158. The rays 170 are then reflected or refracted by the lenses 156 into the eyes of the wearer. In contrast, the glare reducing light module 150 includes an integral projecting portion or blinder extension 154 for reducing potential glare that may be generated as a result of the light 160 emitted by the LED 108 as it is reflected or refracted off the lenses 156 in the glasses 158. The light module 150 is comprised of a housing 162 that includes a first cover member 164 and a second cover member 166. The second cover member 166 includes the blinder extension 154, which is situated between the LED dome and the lens 156 when the light module is mounted to eyeglasses. The blinder extension 154 is configured such that it extends outwards in the direction of the LED 108 and is optimally sized such that the blinder extension 154 blocks the incident rays of light without distracting the wearer or interfering with the light 168 projected for illuminating a reading surface.

Similar to the clip-on glass frame 142, FIGS. 18A, 18B and 19-23 are directed to another clip-on light apparatus 200. As shown, the apparatus 200 includes a frame 202 which spaces the lights along the length thereof. In this regard, the spacer frame 202 includes opposite ends or end portions 204 and 206 to which the lights 16 are mounted. The lights 16 can be provided in the illustrated light modules 150 including the compact housing 162 in which the LED 108 is oriented to project light forwardly so that as depicted in FIG. 9, the amount of light in the predetermined reading distance range 24 is maximized via large double lit area 140 therein with the frame 202 removably secured to the eyeglasses 208 and the lights turned on.

Figure 18A:
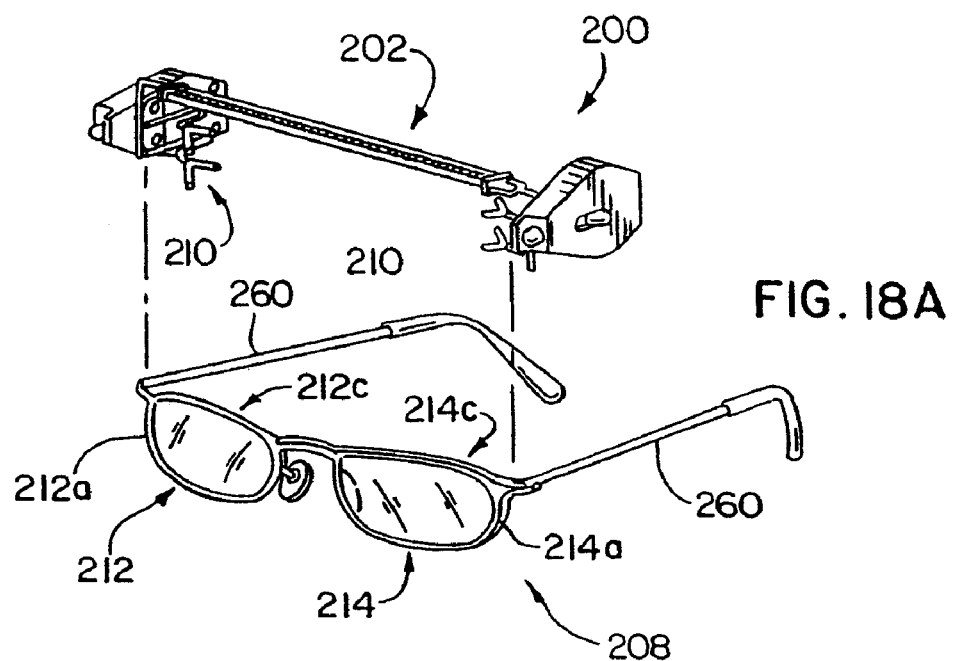
FIG. 18A is a perspective view of a clip-on light apparatus in accordance with another aspect of the present invention showing an adjustable frame with light modules secured at either end thereof.
Figure 18B:
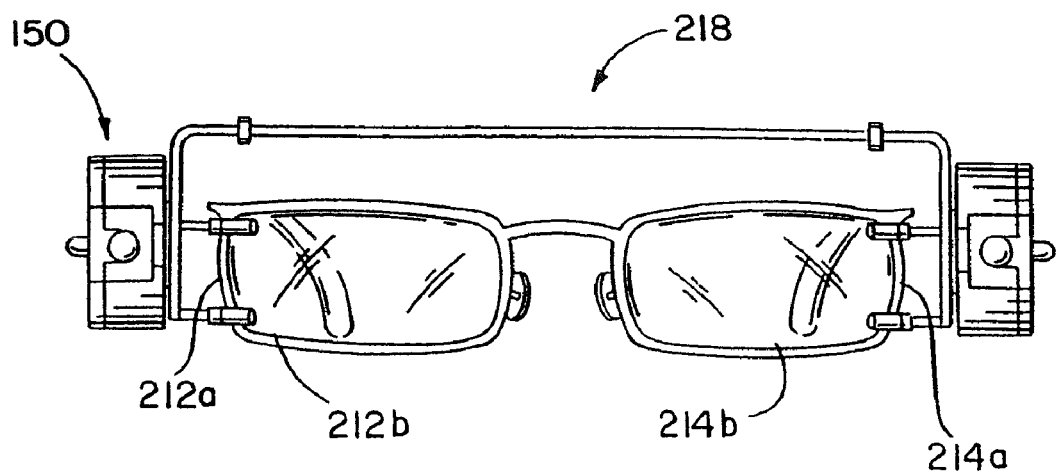
FIG. 18B is a perspective view similar to FIG. 18A showing the clip-on frame removably secured to eyeglasses with the light modules adjacent the lenses.

In the preferred and illustrated form, retainers 210 are provided at the frame end portions 204 and 206 that are configured to grip the lenses 212 and 214 of the eyeglasses 208. In particular, the frame 202 can include spacer rods, generally designated 216, that can be shifted along their length relative to each other to allow the frame 202 to adjust to differently sized eyeglasses 208, and specifically for eyeglasses that have different distances between the outer sides 212a and 214a of their respective lenses 212 and 214, at which the retainers 216 preferably grip the lenses 212 and 214, as shown in FIG. 18B.

Figure 19:
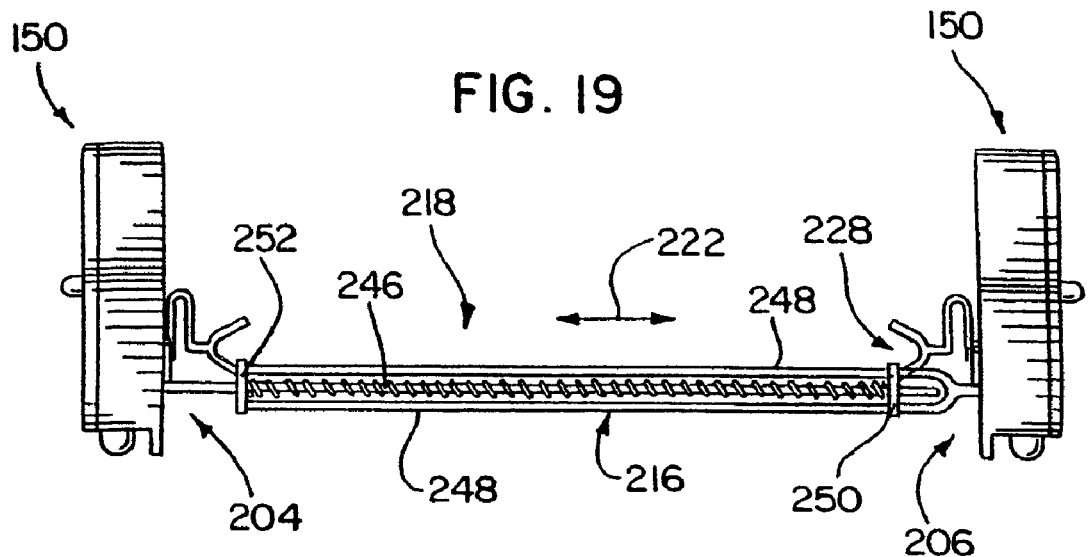
FIG. 19 is a plan view of the clip-on light apparatus showing a draw spring assembly of the frame that allows the end portions to be pulled away from each other against the spring bias.
Figure 21:
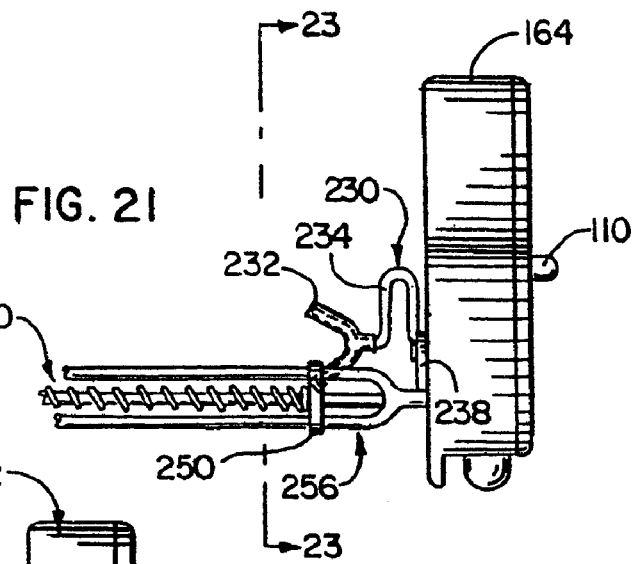
FIG. 21 is an enlarged plan view of one of the frame ends and light module mounted thereto showing a coil spring of the draw spring assembly in an expanded state for close positioning of the light modules relative to each other.
Figure 22:
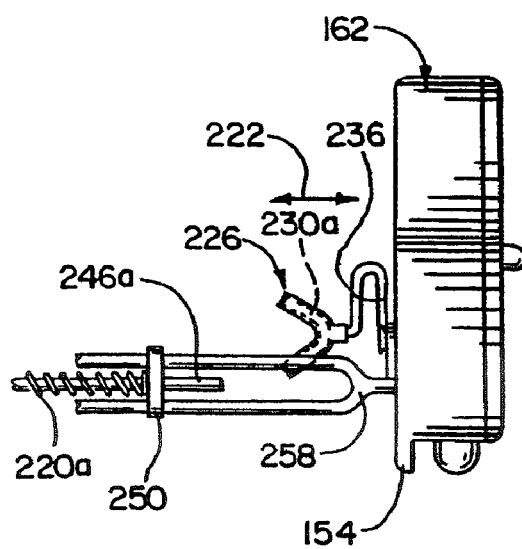
FIG. 22 is a view similar to FIG. 21 showing the frame end portion pulled to compress the spring from its expanded state for shifting the light modules away from each other.
Figure 23:
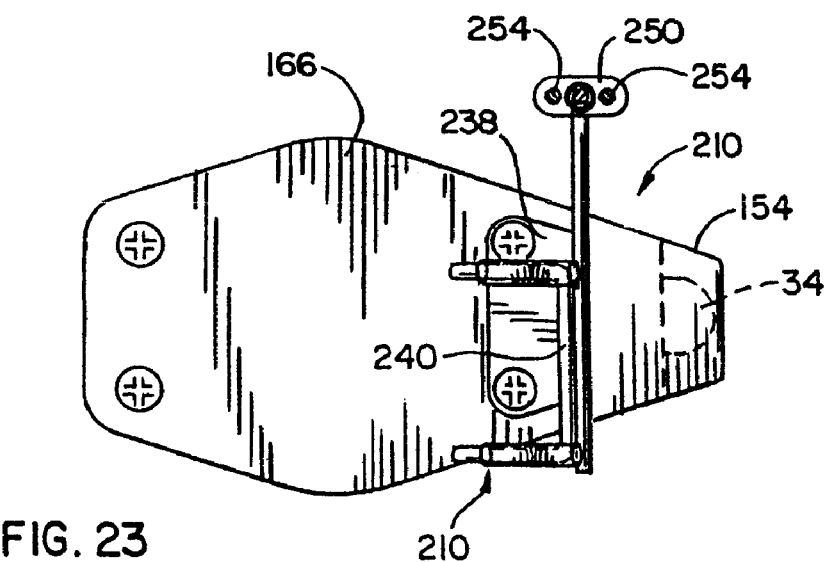
FIG. 23 is a side elevational view taken along line 23-23 of FIG. 21 showing a mounting plate for attaching the frame end portion to the light module.

For this purpose, the rods 216 are preferably incorporated in a draw spring assembly 218, as best seen in FIGS. 19, 21 and 23. The draw spring assembly 218 includes a coil extension spring 220. In the extended state of the spring 220, the frame end portions 204 and 206 are biased toward each other. To fit the adjustable frame 202 onto glasses 208, a user pulls one or both of the end portions 204 and 206 including the associated light modules 150 in a direction away from each other as indicated by double-headed arrow 222 in FIGS. 19 and 22. The pulling action compresses the coils 220a of the spring 220 as shown in FIG. 22 so that the frame 202 is spring loaded toward the FIG. 19 position where the end portions 204 and 206 are at their closest position relative to each other. With the retainers 210 aligned with the lens sides 212a and 214a, the user then allows the end portions 204 and 206 to shift back toward each other under the influence of the spring bias afforded by the compressed spring 220 of the draw spring assembly 218.

As the coils expand, the aligned retainers 210 shift toward each other to grip onto the lens sides 212a and 214a. In this manner, the retainers 210 are spring loaded into secure gripping engagement with the lenses 212 and 214. The retainers 210 at the opposite end portions 210 and 214 are generally spaced at approximately same or slightly greater distance than the distance between the outer lens sides 212a and 214a of the glasses 208 when they are removably attached thereto, as can be seen in FIG. 18B.

Figure 20:
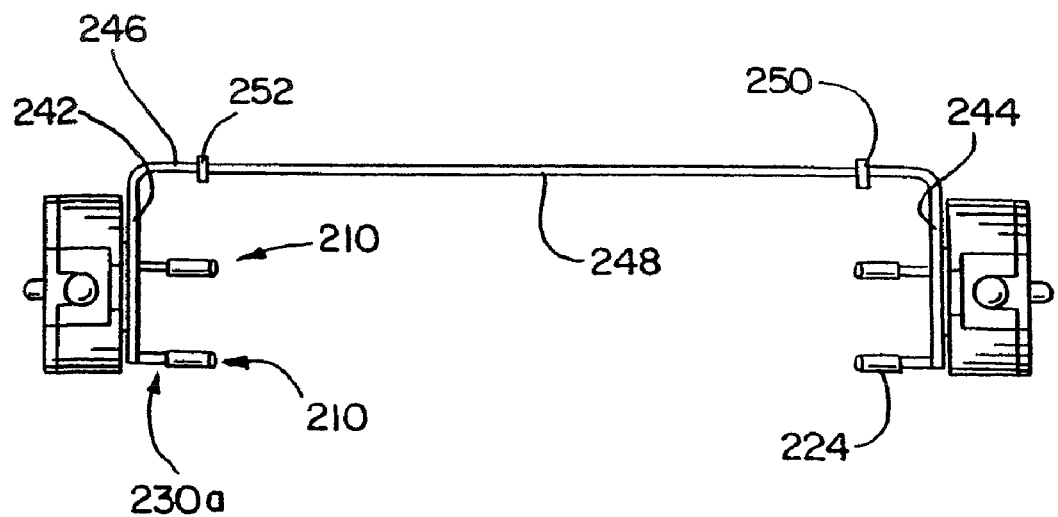
FIG. 20 is a front elevational view of the clip-on light apparatus showing a pair of retainers at either end of the frame that are adapted to engage the eyeglass lenses.

To resist fore and aft shifting of the clip-on frame 202, the retainers 210 preferably have a generally U-shaped configuration including forward and rearward legs 224 and 226, respectively. The lens sides 212a and 214a fit into the space 228 between the small retainer legs 224 and 226 so that the forward legs 224 extend around the front 212b and 214b of the lenses 212 and 214, and the rearward legs 226 extend around the rear 212c and 214c of the lenses 212 and 214. For providing additional stability, a pair of vertically spaced upper and lower retainer members 210 can be provided at either end portion 204 and 206, as best seen in FIG. 20. The upper and lower retainer members 210 grip the lens sides 212a and 214a along their height so that they are above and below each other. By having the vertically spaced retainers 210, pivoting of the apparatus 200 as releasably attached to the eyeglasses 208 such as about a plane defined between a pair of opposite retainers 210 is likewise resisted.

The retainers 210 are mounted to flange arms 230 at inner end portions 230a thereof. The arms 230 are preferably malleable so that the precise position of the retainers 210 can be adjusted for fitting securely against various configurations of lenses 212 and 214, and particularly the outer sides 212a and 214a thereof. For this purpose, the arms 230 are formed of thin wire stock that can be slightly bent such as to bring the upper and lower retainers 210 closer together or further apart depending on the height and configuration of the lens sides 212a and 214a.

Turning to more of the details of the illustrated clip-on light apparatus 200, the arm end portions 224a can be provided with a U-shaped configuration to form a portion of the retainer members 210 that is integral with the arms 230. To improve the frictional engagement of the retainers 210 with the hard material, e.g. metal, glass or hard plastic, of the lenses outer sides 212a and 214a, a small resilient plastic sleeve 232 is fit tightly over the U-shaped arm ends 230a. The sleeve 232 also avoids damaging the eyeglass lenses 212 and 214 with the retainers 210 spring-loaded thereagainst.

As best seen in FIGS. 21 and 22, the arms 230 can extend rearwardly from their inner end retainer portions 230a also generally in a U-shaped configuration opening forwardly so that they have an inner leg 234 connected to the retainer portion 230a and an outer leg 236 connected to the light module 150. More specifically, mounting plate 238 is fastened to the housing cover member 166, as shown in FIG. 23. The outer leg 236 of the mounting arms 230 extends transversely across the plate 238 and is welded or otherwise attached thereto. In the double or paired retainer configuration where two vertically spaced retainers 210 are employed at each end portion 204 and 206 of the light module spacer frame 202, the arms 230 can be formed from a single piece of wire so that there is a vertical wire portion 240 that interconnects the forward ends of the upper and lower outer legs 236 and which can likewise be welded to the plate 238 along the length thereof.

With respect to the frame 202, it can be formed of slightly thicker wire stock vis-a-vis that used for the malleable mounting arms 230 so that the frame 202 is of rigid construction. In the illustrated and preferred form, the spacer frame 202 includes opposite vertical wire portions 242 and 244 welded or otherwise attached to the mounting plates 238 adjacent to and forwardly of the wire portion 240 that inter-connects the retainer arms 230, as previously described. The wire portions 242 and 244 project beyond the top side of the modules 150 so that the draw spring assembly 218 is disposed above the eyeglass lenses 212 and 214 when the clip-on light apparatus 200 is releasably secured thereto, as can be seen in FIG. 18B.

The wire portions 242 and 244 are bent above the modules 150 generally at right angles to extend toward each other. Referring to FIG. 19, a horizontal wire portion or rod 246 extends perpendicular from wire portion 242 and through the barrel formed by the coils 220a of the coil spring 220. A pair of horizontal wire portions or rods 246 extend perpendicular from wire portion 244 on either side of the spring 220 so that the rod 246 extends between the rods 248.

The coil spring 220 is disposed between slide members 250 and 252 that ride on respective rods 248 and 246 for adjusting the length of the frame 202. The slide member 250 is fixedly connected toward distal end 246a of the rod 246 and the slide member 252 is fixedly connected at the distal ends of the rods 248. The slide member 250 extends transversely to span the rods 248 on either side thereof and has a pair of apertures 254 (FIG. 23) sized in clearance fit with the rods 248 so that the slide or plate member 250 can ride therealong. Similarly, the slide or plate member 252 is apertured for riding along the centrally extending rod 246.

The coil spring 220 normally biases the plate members 250 and 252 apart bringing the frame end portions 204 and 206 toward each other. Referring to FIGS. 19 and 21, a stop 256 is formed between yoke juncture 258 of the rods 248 and the projecting rod end 246a that extends beyond slide plate 250 fixed thereto to limit the axial expansion of the spring 220, thus defining the closest axial position of the end portions 204 and 206 and opposite light modules 150. With the rod end 246a engaged against the yoke portion 258, the rods 246 and 248 have their greatest degree of overlap and can no longer be shifted in an inward direction toward each other. As such, with the stop 256 operable, the coils 220a of the spring 220 are at their maximum extended state.

Adjusting the length of the frame 202 by pulling either or both of the frame end portions 204 and 206 in the axial direction 222 causes the opposite plates 250 and 252 to slide toward each other axially compressing the spring 220 and coils 220a thereof therebetween with rod end 246a separating from the yoke portion 258, as shown in FIG. 22. In this manner, the draw spring assembly 218 provides a return force via the compressed spring to bias the retainers 210 at the opposite end portions 204 and 206 back toward each other and into secure engagement with the eyeglasses 208 properly positioned therebetween. Once the coil spring 220 is fully compressed between the plate member 250 and 252, i.e. the adjacent spring coils 220a are engaged without intervening gaps, the maximum length of the frame 202 has been reached thus substantially defining the largest size of eyeglasses 208 as measured between the lenses outer sides 212a and 214a to which the apparatus 200 can be releasably attached or clipped.

With the apparatus 200 releasably secured to the eyeglasses 208, the preferred light modules 150 will be positioned in a manner akin to that as provided on the previously-described lighted eyeglasses 5. Referring to FIGS. 18B and 23, it can be seen that the retainers 210 are disposed toward the forward end of the housing 162 so that the housing 162 will extend adjacent to and rearwardly along the forward portions of the eyeglass temple arms 260 for the majority of the housing length. The forward end of the housing 162 will generally be aligned with the lens front sides 212b and 214b depending on their thickness and degree of curvature. In this manner, the reader will be able to obtain the same benefits as provided by the lighted eyeglasses 5 in terms of having the maximum amount of light trained onto the reading area, while also minimizing glare during reading via the blinder extensions 154 disposed between the LED dome lens 34 projecting out forwardly from the housing 162 and the adjacent eyeglass lenses 212 and 214. At the same time, when lights for reading are not needed, the apparatus 200 can be easily removed to reduce the weight for maximum comfort when wearing the eyeglasses 208.

Figure 24:
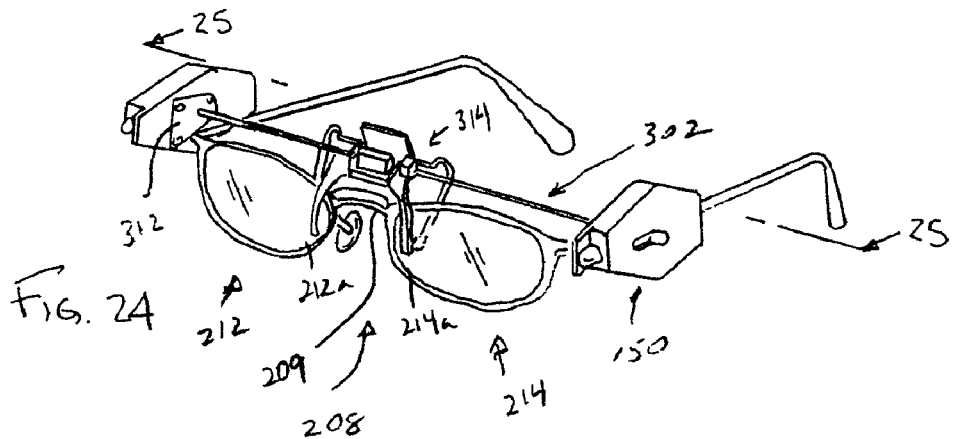
FIG. 24 is a perspective view of a first alternative clip-on apparatus showing a frame having light modules fixed at either end with a clipping mechanism therebetween releasably securing the frame to eyeglasses.
Figure 25:
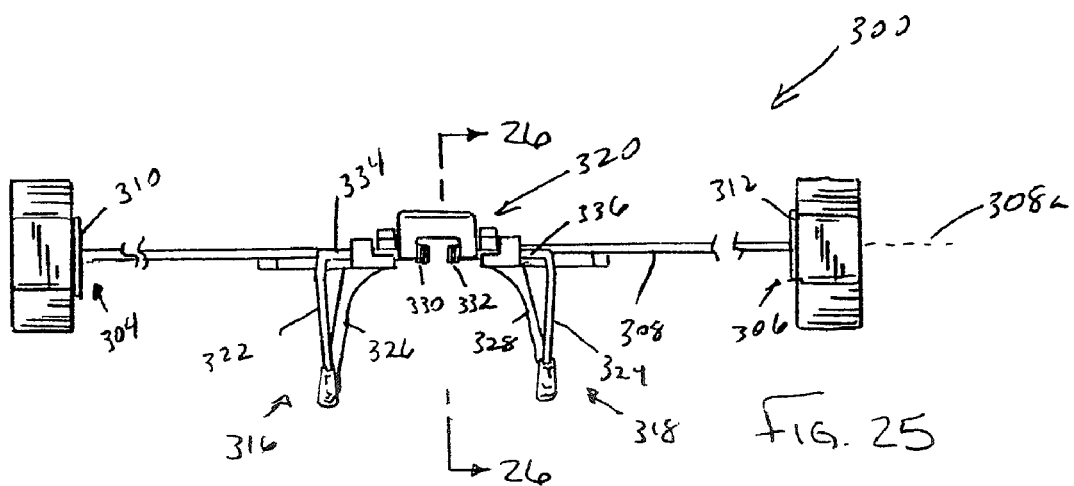
FIG. 25 is a plan view of the first alternative clip-on apparatus showing pairs of clip arms and a pivot actuator therefor.
Figure 26:
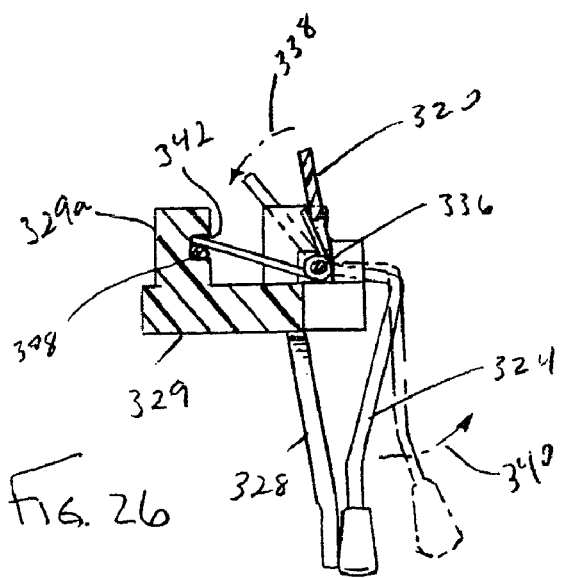
FIG. 26 is a cross-sectional view taken along line 26-26 of FIG. 25 showing pivoting of the actuator for opening the pairs of clip arms.

FIGS. 24-26 illustrate another alterative clip-on light apparatus 300. In this version, the apparatus 300 includes an elongate spacer frame 302 having opposite ends 304 and 306 to which the lights 16 are mounted, which again can be provided in the previously-described light modules 150. However, unlike the apparatus 200 and specifically the spacer frame 202 thereof, the frame 302 is not adjustable in length and thus can be in the form of a single rod 308 having transverse mounting plates 310 and 312 at either frame end 304 and 306 for fastening of the light modules 150 thereto.

To releasably secure the apparatus 300 to the eyeglasses 208, a clipping mechanism 314 is provided intermediate the frame ends 304 and 306 and preferably centrally therebetween to allow the apparatus 300 to be clipped in the area that is generally disposed between the lenses 212 and 214, this area including inner portions 212a and 214a of the respective lenses and the nose bridge 209 extending therebetween. More particularly, the clipping mechanism 314 has spring-loaded arm pairs 316 and 318 that clamp onto the inner lens portions 212a and 214a or the frame portions thereat to minimize interference with the field of view provided through the lenses 212 and 214. An actuator lever 320 is operable to pivot the arm pairs open for securing the apparatus 300 to or removing the apparatus 300 from the eyeglasses 208. With the apparatus 300 releasably clipped onto the eyeglasses 208, the actuator 320 will generally be disposed above the bridge portion 209 of the glasses 208, as can be seen in FIG. 24.

The lever 320 is integrally connected with pivotal clamp arms 322 and 324 of the arm pairs 316 and 318 with the other arms 326 and 328 being fixed relative thereto and integrally formed with base 329 of the clipping mechanism 314. Torsion springs 330 and 332 are attached between the lever 320 and an upstanding wall portion 329a of base 329 to bias the arms 322 and 324 toward associated arms 326 and 328 for clamping the lens potions 212a and 214a therebetween. To open the arm pairs 316 and 318, the lever actuator 320 is pushed against the spring bias provided by springs 330 and 332 to pivot it along with transverse shaft portions 334 and 336 formed integrally between the lever 320 and the arms 322 and 324, respectively, in the direction indicated by arrow 338 in FIG. 26. This pivoting causes pivoting of the integral arms 322 and 324 away from associated arms 326 and 328 in the direction indicated by arrow 340 to separate the ends of the arms 322 and 326 and the arms 324 and 328 from each other allowing the apparatus 300 to be either removed form or secured onto the eyeglasses 208.

As shown in FIG. 26, the rod 308 is captured in a recess 342 formed in the base wall portion 329a by ends of the springs 330 and 332. In this manner, the rod 308 can be rotated about its axis 308a to allow a user to direct the light emanating from the modules 150 to their preferences. The rod 308 can include enlarged stops formed thereon laterally spaced to be disposed on either side of the base 329 and specifically the wall portion 329a to limit axial or longitudinal shifting of the rod 308 relative to the clipping mechanism 314.

Figure 27:
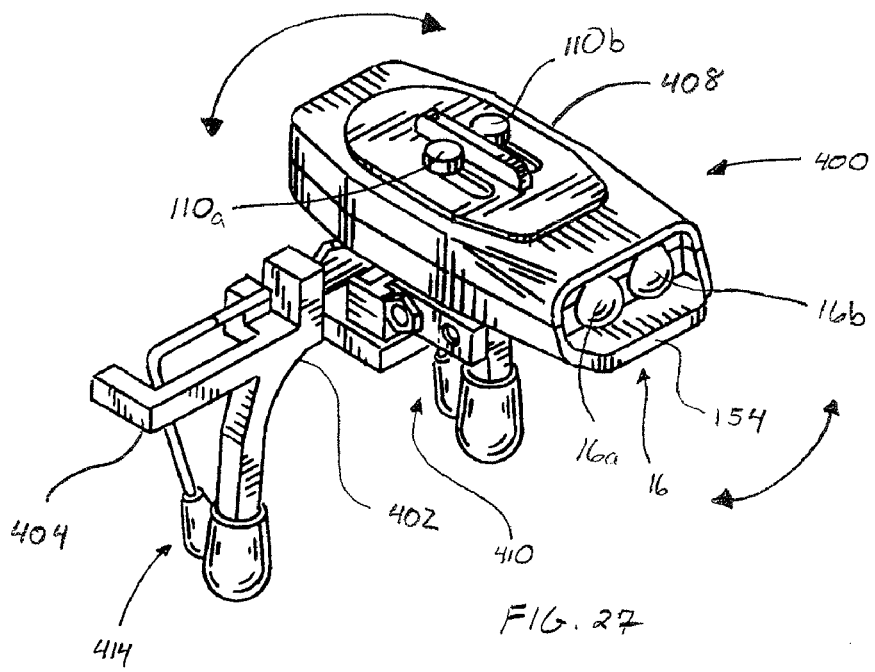
FIG. 27 is a perspective view of another alternative clip-on apparatus showing a light module, a clipping mechanism, and a polyaxial coupling joint between the light module and clipping mechanism.

Turning to FIGS. 27-35, another clip-on light device or apparatus 400 is illustrated. In this version, the apparatus 400 includes a compact frame 402 having opposite ends 404 and 406 with the light source 16 adjustably mounted between the frame ends 404 and 406. This more compact configuration generally provides enhanced stability to the light source 16 when mounted to an item. Similar to the previous embodiments, the light source 16 is preferably provided in a light module 408, such as the previously-described light module 150 that includes the blinder projection 154 adjacent the light source 16 to minimize any glare or stray light emissions in the direction of the blinder. Optionally, the light module 408 may be modified from those previously described. For instance, as shown in FIG. 27, the light module 408 in this embodiment includes a pair of lights 16a and 16b (instead of only one) in the form of two LEDs, which are each energized individually through separate on/off switches 110a and 110b, respectively. Similar to the previous embodiment, the light module 408 preferably contains a pair of stacked batteries.

Figure 28:
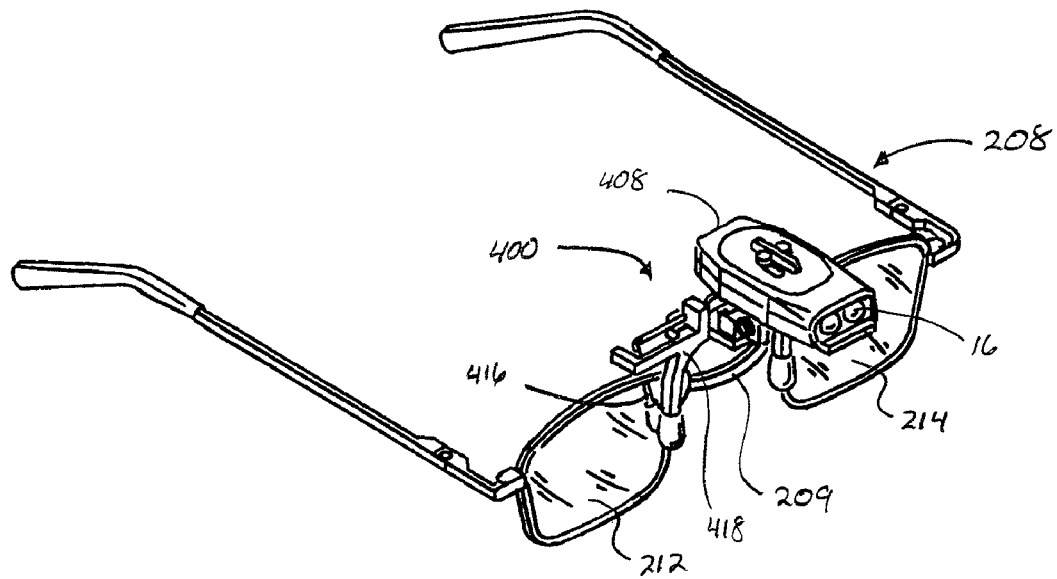
FIG. 28 is a perspective view of the clip-on apparatus of FIG. 27 removably secured to a pair of eyeglasses.

Unlike the previously described clip-on devices 200 and 300 that position their respective light modules 150 at forward ends of the eyeglass temple arms to provide the lights 16 on opposite sides of the eyeglass cross frame member, the apparatus 400 permits the light module 408 to be releasably secured, for example, near the central, bridge portion 209 of the eyeglasses 208 to provide illumination more centrally between the viewing lens 212 and 214 of the eyeglasses 208 as illustrated in FIG. 28. However, while securing to eyeglasses is one preferred use, the clip-on light apparatus 400 may also be secured to other items, including but not limited to, baseball caps (such as a forward edge of a cap brim), hats, clothing, books, computers, shelving, cabinets, or other relatively thin objects that provide a suitable mounting position for projection of illumination therefrom.

The clip on-apparatus 400 includes a polyaxial coupling joint 410 between the light module 408 and the frame 402. The polyaxial coupling joint 410 permits the light module 408 to be pivoted about a plurality of axes for directing light from the light module 408 in a plurality of directions therefrom. The polyaxial coupling joint 410 provides advantages over prior art lighted glasses or other clip-on light devices that only permit pivoting of the light source about a single pivot axis. The polyaxial coupling joint 410, on the other hand, permits orientation of light 16 along a plurality of axes for directing light from the apparatus 400 in multiple directions with minimal movement of the frame 402. The apparatus 400, therefore, is more versatile than prior art clip-on lighting devices, especially when coupled to eyeglasses or a hat, because the direction of the light can be changed by pivoting the light module 408 relative to the frame 402 in a variety of directions instead of the user needing to turn their head or reposition the entire device when used with headgear such as glasses and baseball caps.

To releasably secure or clip the apparatus 400 to an item, such as eyeglass frames or the brim of a baseball cap, the frame 402 includes a clipping mechanism 414 that is provided intermediate the frame ends 404 and 406. Preferably, the clipping mechanism 414 is positioned centrally between the frame ends 404 and 406 to provide a more compact configuration and to permit the apparatus 400 to be clipped in an area that is generally disposed between the lenses 212 and 214 of the eyeglasses 208. In one form, the clipping mechanism 414 includes two spring-loaded pairs of arms 416 and 418 that are biased together to permit the apparatus 400 to be clipped to an item inserted between the arms 416 and 418. An actuator in the form of lever 420 is operable to shift the both pairs of arms to an open position so that the apparatus 400 to or removing the apparatus 400 from the item, such as the eyeglasses 208 as shown in FIG. 28. The clipping mechanism 414 is similar to the clipping mechanism 314 previously described with apparatus 300 (FIGS. 25 and 26), and therefore, its common features will not be described further with respect to apparatus 400.

The lever 420 is connected to clamp arm 416, which is formed from a pair of spaced clamp arms 422 and 424. Clamp arm 418 is preferably integral with the frame 403 and formed from a pair of spaced clamp arms 429 and 431. As best shown in FIGS. 27 and 29, upper portions of each of the clamp arms 422 and 424 extend through holding portions 425 of the frame 403 that extend above an upper surface 405 thereof. The frame holding portion 425 preferably includes a pair of spaced ribs 427 with each clamp arm 422 and 424 extending through the space formed between the ribs 427. As shown, the forwardly spaced rib 427 forms an inverted L-shaped to provide a more secure holding socket 427 to better hold the clamp arms 422 and 424 to the frame 403.

Referring again to FIG. 28, the apparatus 400 is illustrated in a preferred use releasably secured to the eyeglass frames 208. To this end, the clipping mechanism 414 is arranged and configured to be releasably secured to the lenses 212 and 214 of the exemplary eyeglasses 208. That is, for example, each of the spaced clamp arms 422, 424 and 429, 431 are spaced along the frame 403 so that the arms 422, 424, 429, and 431 each contact the lens portions 212 and 214 of the eyeglasses 208 as best shown in FIG. 28. In a preferred form, arms 422 and 429 releasably secure the lens 212 therebetween, and arms 424 and 431 releasably secure the lens 214 therebetween.

Such releasable coupling is advantageous because it provides a more secure attachment of the apparatus 400 to the glasses 208 than securing only to the eyeglass frame or temple arms. To minimize damage to the eyeglass lenses 212 and 214, a portion of each clamp arm 422, 424, 429, and 431 that contacts the lens surfaces is preferably covered by a protective cap 433. In one form, the cap 433 is a rubber or nylon covering around the lower portion of each clamp arm. The cap 433 helps minimize any scratching or marking of the lens and aids in providing a secure coupling with the clipping mechanism to the eyeglasses In a preferred form, the polyaxial coupling joint 410 includes a ball 430 and a socket 434 as best illustrated in FIGS. 29-32. As illustrated, the ball portion 430 is associated with the light module 408 spaced from a lower surface 432 thereof and the socket portion 434 is associated with the frame 402 and is arranged and configured to receive portions of the ball 430 therein. Preferably, the socket portion 434 is formed integral with the frame 402 such that it is molded in one piece therewith. Manifestly, the ball portion 430 may be associated with the frame 402 and the socket portion 434 may be associated with the light module 408. As further described below, such ball and socket configuration permits the light module 408 to be pivoted about a plurality of axes for directing the light in a plurality of directions as needed.

More specifically, the ball portion 430 of the polyaxial coupling joint 410 preferably includes an elongate, post 436 and a spherical ball 438 formed at a distal end 440 of the post 436, as best shown in FIG. 31. Preferably, the spherical ball 438 has a diameter larger than the diameter of the post 436. The post 436 is connected to the lower surface 432 of the light module 408 as by threading. A proximal end 442 of the post 436 can include external threads 444 that threadably mate with internal threads in bore 446 formed in mounting portion on boss 448 of the light module 408 depending from the lower surface 432 thereof. As illustrated, the boss 448 includes a frustoconical portion 450 and a cylindrical portion 452 with the bore 446 defined in the cylindrical portion 452. Other methods of connecting the mounting post 436 to the light module 408 can also be employed.

With the above described threaded relationship, the distance A (FIG. 30) that the light module 408 is spaced from the frame 402, and specifically elongate base portion 403 thereof, may be varied if needed. For example, advancing or threading the post 436 further into the bore 446 brings the light module 408 closer to the frame base 403. Conversely, retracting or unthreading the post 436 out of the bore 446 shifts the light module 408 further away from the frame base 403. Varying the distance A may provide yet another mechanism to vary the direction light is projected from the light module. In addition, as further discussed below, varying the distance A in some cases can alter the degree of pivoting of the light module about certain axes.

As mentioned, the polyaxial coupling joint permits pivoting of the light module about several different axes. In particular and referring to FIGS. 32 and 33, the light module can be pivoted about axis X. This allows the light from the module to be directed in various directions forwardly from the item to which it is clipped including slightly upwardly in the forward direction before the frame interferes with continual upward pivoting. Also, the module can be pivoted for a much greater range downwardly for directing light accordingly. In fact, with the light module oriented so that its central axis Y extends substantially orthogonal to the elongate base 403, the lateral spacing of the pairs of clamp arms allows the module to be pivoted downwardly and then back toward and through the clamp arm pairs only limited by the item to which the light apparatus is clipped or the frame 402 to direct light rearwardly.

The light module can also be pivoted about the axis 437 of the pivot shaft 436 which itself is pivoted about axis X as described above. More particularly, the module can be turned or rotated about a shaft axis, preferably for 360 degrees thereabout (e.g., FIG. 27). In FIG. 32, the shaft axis 437 is shown as coinciding with the Z-axis so that the module 408 can be turned thereabout when pivoted to its highest position relative to the frame about the X-axis. Otherwise, 360 degree pivoting of the module is only limited when the module and its connected mounting shaft have been pivoted about the X-axis so that the module extends through the pairs of clamping arms to project light rearwardly. In this instance, the module can be pivoted one way or the other about the shaft axis until engaged with the corresponding clamp arm or arms. Accordingly, rotation of the module occurs about a pivoting, pivotal axis that extends orthogonal to the fixed pivot axis X.

The polyaxial coupling joint also permits the module to be pivoted about or through a pivot plane laterally to either side thereof. The plane is defined by the Y and Z axes, with the X-axis extending orthogonal thereto. In this regard, the moving shaft pivots in the pivot plane about the X-axis. Referring to FIGS. 34 and 35, it can be seen that the module may be allowed to pivot laterally to either side of the Y-Z plane. This lateral pivoting is generated by play in the polyaxial coupling joint and thus provides a much smaller amount of pivoting than allowed about axis X. A retention or tightening device 462 is also provided that is operable to control the amount of play or to substantially eliminate it so that the lateral pivoting can be restricted or substantially eliminated if desired.

Referring again to FIGS. 30-32, the socket portion 434 preferably includes a pair of openings 454 positioned on either side of the spherical ball 438 where diametrically opposite portions 439 thereof (see FIG. 30) project into both of the openings 454. In one form, the socket portion 434 includes a pair of spaced, facing support arms 460 extending forwardly from the frame base 403. In particular, the facing support arms 460 project forwardly from a base wall 456 that extends upwardly from a pedestal portion 458 of the frame 403. As shown in FIG. 31, each of the spaced, facing support arms 460 have one of the openings 454 formed therein and extending therethrough, although recessed openings could also be provided. To form the ball and socket configuration of the polyaxial coupling joint 410, the spherical ball 438 is positioned in a space 455 formed between the facing support arms 460 so that the diametrically opposite portions 439 of the spherical ball 438 are each received in one of the socket openings 454.

To securely hold the spherical ball 438 within the socket openings 454, the socket portion 434 also preferably includes the retention device 462 which is operable to draw the facing support arms 460 toward each other. The portions 439 of the spherical ball 438 received in the socket openings 454, therefore, can be more securely held therein due to an increased holding or gripping force provided by the support arms 460 being drawn together to clamp the spherical ball 438 therebetween. To this end, the support arms 460 are preferably formed from a flexible material such as plastic so that the arms can be drawn toward each other to provide increased frictional forces on the ball 438. Shifting the support arms 460 toward each other in such manner provides resistance to the pivoting of the light module 408 about the X-axis, minimizes play in the lateral pivoting of the light module 408 with respect to the Y-Z plane, and also resists the splaying of the support arms 460.

The retention device 462 may also permit a user to hold or fix the light module 408 in a predetermined position while still allowing rotation thereof about the pivot shaft 436. For example, by increasing the force provided by the support arms 460 on the spherical ball 438 a sufficient amount, the pivot shaft 436, and thus the light module 408 can be fixed against pivoting about the X-axis with the support arms 460 tightly clamping the spherical ball 438 therebetween. If repositioning of the light module 408 about the X-axis or laterally relative to the Y-Z plane is again desired, a user may decrease the frictional force between the support arms 460 and the ball bearing 430 with the arms 460 shifting outwardly toward their original position to permit the desired pivoting action of the light module 408. It should be noted that fixing the pivot shaft 436 against pivoting about the X-axis will take greater clamping forces applied by the socket arms on the ball over that required to keep the module from being pivoted laterally with respect to the Y-Z plane In a preferred form, the retention device 462 is in the form of a threaded fastener, such as a threaded screw 464 and a nut 468 that is received on a distal end of the screw 464 as best shown in FIGS. 30 and 31. In order to draw the arms 460 toward each other, the screw 464 has a sufficient length such that it that may extend through tensioning holes 466 in both support arms 460 and still be able to receive the nut 468 thereon once extended through both tensioning holes 466. Resistance to the pivoting of the light module 408 may be varied either by loosening or tightening the nut 468 on the screw 464 to either relax the support arms 460 or draw the support arms 460 in closer, respectively. That is, advancing the nut 468 along the length of the screw 464 draws the support arms 460 toward each other, and unthreading the nut 468 from the screw 464 permits the arms 460 to flex or shift outwardly from each other. Drawing the support arms 460 closer together causes them to contact the spherical ball 438 with an increased clamping force resulting in more frictional resistance to pivoting of the light module 408. Conversely, relaxing the support arms 460 decreases the clamping force against the spherical ball 438 permitting greater freedom of movement in the ball and socket joint.

Returning to FIGS. 32-35, the pivoting of the light module 408 via the polyaxial coupling joint 410 will be described in more detail. As previously described, the ball and socket configuration of the coupling joint 410 permits the light module 408 to pivot about an X axis (FIGS. 32 and 33). In the illustrated and preferred form, the X-axis extends through both socket openings 454 and about a moving pivot axis coinciding with the axis 437 of the mounting shaft or post 436. FIGS. 34 and 35 illustrate the pivoting movements of the light module 408 relative to the moving axis and the Y-Z plane in which it is pivotal when the light module 408 is positioned along the respective Y and Z coordinate axes, which are both orthogonal to the above described X axis and to each other. When pivoting about the moving axis, the light module 408 is moving generally transverse to the support arms 460. Of course, the light module 408 can also pivot in a similar manner about the moving axis through other axes lines between the Y and Z axes lying in the Y-Z plane. Furthermore, the light module 408 is also free to rotate up to 360 degrees about the moving axes through the post 436 and bearing ball 438 at the end thereof (see, e.g., FIG. 32).

Therefore, as mentioned above, the polyaxial coupling joint 410 permits the light module 408 to be positioned in a plurality of directions without the user needing to move the frame 402, turn their head (in the case of the apparatus coupled to eyeglasses or a baseball cap), or reposition the apparatus. When coupled to other items, such as shelving or computers, the apparatus 400 provides light in a wider variety of directions than prior art devices that only pivot about a single axis. With only a single pivot axis, the prior art devices generally need to be repositioned or moved to orient light over a plurality of axial directions.

Preferably, the light module 408 does not pivot the same amount about each axis. For example, as illustrated in FIGS. 33-35, the light module 408 pivots a relatively large amount about the X axis, and a relatively smaller amount about the moving axis. The smaller pivoting or play about the moving axis is due in part to stop portions 461 of the support arms 160 interfering with the pivoting motion of the light module 408 about the moving axis. As shown in FIG. 32, the stop portions 461 are on outer edges of the support arms 460 and engage the cylindrical post 436 during pivoting about the moving axis. If desired, the play or pivoting about the moving axis can be reduced upon tightening the retention device as described above.

Turning to FIG. 33, the polyaxial coupling joint 410 permits the light module 408 to freely pivot through a relatively large angle a about the X axis, which is preferably greater than 180 degrees. On the other hand, due to the interference with the stop portions 461 on the support arms 460, the polyaxial coupling joint 410 permits the light module to pivot about the moving axis through a relatively smaller angle β. For example, when the light module 408 is positioned along the Y coordinate as shown in FIG. 34, the polyaxial coupling joint 410 and the stops 461 permit pivoting about the moving axis of up to about 40 to about 50 degrees, and when the light module 408 is positioned along the Z coordinate axis as shown in FIG. 35, the polyaxial coupling joint 410 permits pivoting about the moving axis of up to about 20.

As mentioned above, in some cases, the degree of pivoting or play about the moving axis can be varied. In one case, the motion about the moving axis can be varied by modifying the distance A between the light module lower surface 432 and the frame 402. That is, for example, the larger the distance A, a relatively larger degree of pivoting about the moving axis may be achieved because the larger distance A permits greater clearance between the light module 408 and the support arms 460. Conversely, the smaller the distance A, a relatively smaller degree of pivoting about the moving axis can be achieved because the light module 408 has less clearance with the support arms 460. In another case, the degree of pivoting about the moving axis can be changed by either varying a length or width of the support arms 460 to vary the location of the stop portions 461 relative to the cylindrical post 436. For example, a longer and/or wider support arm 460 will general permit the light module 408 to pivot less about the moving axis, while a shorter and/or narrower support arm 460 will permit a greater degree of pivoting about the moving axis. In yet another case, increasing the tension on the polyaxial coupling joint 410 by tightening the retention device 462 will also minimize or decrease the amount of pivoting about the moving axis.

The apparatus 400, when secured to an item, provides a device to direct a light source in one of a plurality of directions with minimal movement of them or repositioning of the apparatus. In addition, the configuration of the apparatus and the use of the retention device permits modifying the amount of movement as needed in any particular case.

While there have been illustrated and described particular embodiments of the present invention, it will be appreciated that numerous changes and modifications will occur to those skilled in the art, and it is intended in the appended claims to cover all those changes and modifications that fall within the true sprit and scope of the present invention.

What is claimed is:

1. A clip-on light apparatus comprising:
  a self-contained light module including a housing containing a light source for generating light therefrom, a power source for energizing the light source, and a switch for being shifted to turn the light source "on" and "off";
  a clipping mechanism for releasably securing the light module to an item for projecting light therefrom;
  a polyaxial coupling joint assembly between the light module and the clipping mechanism that allows the light module to be pivoted about a plurality of axes that intersect each other for directing light from the light module in a desired direction;
  a unitary post mounting member of the polyaxial coupling joint assembly connected between the self-contained light module and the clipping mechanism and which extends along one of the plurality of axes about which the self-contained light module is pivotal, with spacing of the self-contained light module from the clipping mechanism by the unitary post mounting member and the arrangement of the power source in the housing allowing the self-contained light module including the light source to be rotated for 360 degrees about the one axis;
  a ball on one end of the unitary post mounting member and the unitary post mounting member being directly secured at an opposite end of the unitary post mounting member to the self-contained light module;
  a pair of parallel spaced support arms of the polyaxial coupling joint assembly that are directly connected to the clipping mechanism to be fixed relative thereto, each support arm has a socket bore that extends completely therethrough so that the socket bore of each support arm is aligned along one of the plurality of axes; and
  the unitary post mounting member extends away from the self-contained light module to position the ball between the parallel support arms so that the ball is received in the socket bores thereof.

2. The clip-on light apparatus of claim 1, wherein the clipping mechanism includes an actuator operable to secure the module to the item and to remove the module from the item.

3. The clip-on light apparatus of claim 2, wherein the actuator comprises a pivot lever, and
  at least one pair of clamp arms biased to a clamping position for securing the module to an item with the pivot lever operable to shift at least one of the clamp arms to a release position for removing the module from the item.

4. The clip-on light apparatus of claim 3, wherein the at least one pair of clamp arms comprises two pairs of clamp arms spaced on either side of the polyaxial coupling joint assembly with both clamp arm pairs being operable by the pivot lever for shifting between clamping and release positions thereof.

5. The clip-on light apparatus of claim 4, wherein the the pair of parallel spaced support arms of the polyaxial coupling joint assembly include a retention device that draws the support arms toward each other so that the ball is securely received in the socket bores.

6. The clip-on light apparatus of claim 5, wherein the retention device includes a threaded fastener.

7. The clip-on light apparatus of claim 1, wherein the polyaxial coupling joint assembly is configured to allow the light module to pivot about at least two of the plurality of axes that extend substantially orthogonal to each other.

8. The clip-on light apparatus of claim 7, wherein the light module is rotatably mounted about the unitary post mounting member so that the one pivot axis extends along the unitary post mounting member, and the unitary post mounting member is pivotal about the other of the at least two pivot axes.

9. The clip-on light apparatus of claim 7, wherein the light module includes the unitary post mounting member having an axis coinciding with one of the orthogonal axes with the light module being rotatable thereabout, and the unitary post mounting member is pivotal about the other of the orthogonal axes.

10. The clip-on light apparatus of claim 1, wherein the light source comprises a pair of LEDs.

11. The clip-on light apparatus of claim 10, wherein the housing includes a blinder projection adjacent the light source.

* * * * *